(12) United States Patent
Chen

(10) Patent No.: US 7,068,765 B2
(45) Date of Patent: Jun. 27, 2006

(54) EXTERNAL BILATERAL TELEPHONE INTERFACE REMOTE CONTROL SYSTEM

(76) Inventor: Tseng-Yao Chen, Rm. B11-L Bldg. 77, 195 Sec. 4, Chung Hsing Rd., Chutung, Hsinchu 310 (TW)

( * ) Notice: Subject to any disclaimer, the term of this patent is extended or adjusted under 35 U.S.C. 154(b) by 72 days.

(21) Appl. No.: 10/709,126

(22) Filed: Apr. 15, 2004

(65) Prior Publication Data

US 2005/0232403 A1    Oct. 20, 2005

(51) Int. Cl.
*H04M 11/00*    (2006.01)
(52) U.S. Cl. ............. 379/102.05; 379/102.06; 379/102.01
(58) Field of Classification Search ............... 379/102.01–106.01
See application file for complete search history.

(56) References Cited

U.S. PATENT DOCUMENTS

| | | | | |
|---|---|---|---|---|
| 4,436,958 A | * | 3/1984 | Hansen et al. | 379/102.06 |
| 4,885,766 A | * | 12/1989 | Yasuoka et al. | 379/102.03 |
| 5,646,605 A | * | 7/1997 | Leonaggeo et al. | 379/102.06 |
| 5,774,529 A | * | 6/1998 | Johannsen et al. | 379/106.03 |
| 6,021,324 A | * | 2/2000 | Sizer et al. | 379/102.01 |
| 6,512,820 B1 | * | 1/2003 | Weng | 379/102.05 |

* cited by examiner

*Primary Examiner*—Wing Chan
(74) *Attorney, Agent, or Firm*—Jiang Chyun IP Office

(57) ABSTRACT

An external bilateral phone interface remote control system is disclosed. The external bilateral phone interface remote control system includes an external remote control host and a separate external addition-type remote control extension. The external remote control host having an input terminal coupled to a phone line. The separate external addition-type remote control extension is coupled to a wire or wireless switch for forming a remote control network as to control the wire or wireless switch by a phone. The separate external addition-type remote control extension includes a feedback module, adapted for feeding back an identified signal to the original super via the network and the phone line for achieving the bilateral control.

22 Claims, 25 Drawing Sheets

EXTERNAL BILATERAL TELEPHONE INTERFACE REMOTE CONTROL SYSTEM

BACKGROUND OF THE INVENTION

1. Field of the Invention

The present invention relates to a remote control system, and more particularly to an external bilateral telephone interface remote control system.

2. Description of the Related Art

The present invention is related to an external bilateral phone interface remote control system which is adapted for factory safety, home security and gas control. The external bilateral phone interface comprises an external remote control host having an input terminal coupled to an indoor or an outdoor phone line and an output terminal coupled to an external remote control extension indoor of a wire or wireless switch, for forming a remote control network to control the wire or wireless switch by dialing the phone number. The external remote control extension comprises a feedback module, adapted to feed back an identified signal to the original caller via the network and the phone line for achieving the bilateral control.

Usually, alarm devices which are controlled by internal circuits, are applied to automatic equipment for preventing misoperations by users. Although these devices perform alarm function, they increase manufacturing costs and users need to determine whether the alarm is true and to resolve the problem causing false alarm due to the faulty alarm signal. If a malfunction occurs in the nighttime and the users are not in the factory or cannot adequately solve the abnormal situation, the equipment may break down or may even cause fire in the factory. For example, the fire accidents of Windbond Electronic Corporation and United Integrated Circuits Corporation in 1996 and 1997, respectively, caused billions dollars loss. The cause of the loss in these fire accidents were due to fact that the operators did not properly handle the fire at the beginning stage of the accident.

Usually, doors of houses are equipped with locks. However, when the locks are not strong enough, the thieves may break into the houses and take away the valuable property of the owners without difficulty. Moreover, the loss or oblivion of key by the house owners cause inconvenience of accessing into the house. Therefore, a security remote system controlled by dialing the phone number for making sure whether the door is locked or for controlling the lock is developed.

Moreover, it is also possible that a user may forget about the cooking and thereby forget to turn off the stove. The oblivion of turning off the stove may result in a fire accident, causing the loss of property, injury or death. Therefore, a remote control system for turning off the switch of the stove is highly desirable.

TW Pat. No. 124,097, entitled to "phone remote control system," TW Pat. No. 214,351, entitled to "phone remote control system for family," and TW Pat. No. 371,131, entitled to "super of phone remote control system" disclosed devices and methods for remotely controlling the electrical devices of houses. The first two patents are related to the control system between the phone line and the power line, wherein the power line serves to transmit signals. However, they face the problems of noises, pulses and interference. Practically, hardly can these problems be resolved even if the advanced chips are applied thereto. The last one discloses, in addition to the phone control, relays and memories for cooperating with the system to control the turning-on or turning-off thereof. The prior art systems need power lines or relays. However, they still cannot make sure whether the operation of the switch of the equipment or the door is functioning properly. Therefore, the remote super has completed the process, but the switch of the equipment or door does not completely operate. Accordingly, a new remote control system to resolve the issues described above is highly desirable.

SUMMARY OF THE INVENTION

Therefore, according to the disadvantages described above, the present invention discloses an external bilateral telephone interface remote control system. The external bilateral telephone interface remote control system comprises an external remote control host having an input terminal coupled to an indoor or an outdoor phone line and an output terminal coupled to an separate external addition-type remote control extension of a wire or wireless switch indoor for forming a remote control network to control the wire or wireless switch by dialing a phone number. The separate external addition-type remote control extension has a feedback module, adapted to feed back the switching signals of the wire or wireless equipment. By using the remote control network and the phone line, the signals could be transmitted to the original caller for bilateral control.

The present invention has at least two following features: (1) the remote control system can form a remote control network without substantially changing the wire or wireless control system, the supers can control the switch of the equipment when the users are not in the factory; and (2) the separate external addition-type remote control extension has a feedback module, adapted to feed back the switching signals of the wire or wireless equipment for transmitting the signals to the supers via the remote control network and the phone line for bilateral control.

According to the embodiment of the present invention, the external bilateral telephone interface remote control system comprises: an external remote control host having an input terminal coupled to a phone line and an output terminal coupled to an separate external addition-type remote control extension indoor of a wire or wireless switch for forming a remote control network to control the wire or wireless switch by dialing a phone number. The external remote control main frame comprises a phone interface processing unit, a memory unit, a processing unit, a display unit, a RF wireless transceiving unit and a RF wireless transceiving unit of the separate external addition-type remote control extension. The phone interface processing unit is adapted for processing and receiving phone signals. The memory unit is adapted for storing a preset remote control code. The processing unit is adapted for identifying and processing a control signal from the phone line. The display unit is adapted for displaying a power situation of the separate external addition-type remote control extension. The RF wireless transceiving unit is adapted for receiving and transmitting correct control signals from the processing unit. The separate external addition-type remote control extension comprises a feed back module, a processing unit, a switch driving module and an address encoding unit. The feed back module is adapted for generating a feedback signal. The processing unit is adapted for identifying and processing a remote control signal from the RF wireless transceiving unit of the separate external addition-type remote control extension and the feedback signal from the feedback module. The switch driving module is adapted for turning on or off the wire or wireless switch according to the remote control signal from the processing unit. The address encoding unit is adapted for encoding the on or off of the switch.

According to a second embodiment of the present invention, the external remote control host further comprises a power supply and a battery charging and detecting unit disposed between the processing unit and the power supply.

According to a third embodiment of the present invention, the external remote control host further comprises a keyboard unit coupled to the processing unit.

According to a fourth embodiment of the present invention, the separate external addition-type remote control extension further comprises a super display comprising a phone interface processing unit, a memory, a processing unit and a display. The super display is adapted for receiving and transmitting a phone signal. The memory is adapted for storing a preset remote control code. The processing unit is adapted for identifying and processing a remote control signal. The display unit is adapted for displaying an operation condition of a wire or wireless equipment coupled to the separate external addition-type remote control extension.

According to a fifth embodiment of the present invention, the super display further comprises a power supply and a battery charging and detecting unit disposed between the processing unit and the power supply.

According to a sixth embodiment of the present invention, the super display further comprises a keyboard unit coupled to the processing unit.

According to a seventh embodiment of the present invention, the external bilateral telephone interface remote control system comprises an external remote control host having an input terminal coupled to an indoor or an outdoor phone line and an output terminal coupled to an separate external addition-type remote control extension of a wire or wireless switch indoor for forming a remote control network to control the wire or wireless switch via phone.

The external remote control host comprises a phone transmitting module, a memory unit, a processing unit, a keyboard of the host and the separate external addition-type remote control extension, a display unit and a RF wireless transceiving unit. The phone transmitting module is adapted for informing a remote super of abnormal data detected by the sensing unit and the switching driving module of the separate external addition-type remote control extension through preset phone numbers and voice messages so that the remote super inputs control signals via a phone for controlling the wire or wireless equipment. The memory unit is adapted for storing preset remote control codes, the control signals and feedback signals from a RF wireless transceiving unit of the separate external addition-type remote control extension. The processing unit is adapted for identifying and processing the control signals from the phone line. The display unit is adapted for displaying a power situation of the separate external addition-type remote control extension and an operation thereof. The RF wireless transceiving unit is adapted for receiving and transmitting correct control signals and feedback signals from the processing unit and a RF wireless transceiving unit of the separate external addition-type remote control extension. The alarm unit is adapted for sending out alarm signals.

The separate external addition-type remote control extension comprises a shell a sensing unit, a switch driving module, a feed back module, a sensing driving circuit unit, a setting unit, a processing unit and a switch driving module. The sensing unit is adapted for sensing data of temperature, pressure, concentration, wind or PH value. The switch driving module is adapted for turning on or off the wire or wireless switch. The feed back module is adapted for generating a feedback signal thereby performing the bilateral remote control via the remote control network and the phone line. The sensing driving circuit unit is adapted for transmitting the data of temperature, pressure, concentration, wind or PH value to a comparator unit. The setting unit is adapted for setting factors for temperature, pressure, concentration, wind or PH value. The comparing unit is adapted for determining whether the data are over the factors of temperature, pressure, concentration, wind or PH value, whether the switch driving module should be turned on and whether a feedback signal should be transmitted to the host. The processing unit is adapted for identifying and processing a remote control signal from the RF wireless transceiving unit of the separate external addition-type remote control extension and the feedback signal from the feedback module. The switch driving module is adapted for turning on or off the wire or wireless.

According to an embodiment of the present invention, the wall-hanging remote control extension comprises: a shell, a RF wireless transceiving unit, a processing unit, an address encoding unit, a charging and detecting unit, a switch driving module having a switching driving circuit, a motor, a cam fixed on the axis of the motor, a spring stick disposed between a cam and an indoor switch, such as a manual switch of a magnetic lock, and a feedback module. When the RF wireless transceiving unit receives a remote switching signal from the remote control host, the remote switching signal is transmitted to and processed by the processing unit for generating a control signal, which passes through the switch driving circuit unit to the motor for rotating a proper angle as to push the button of the magnetic lock upward, to turn on a circuit of the magnetic lock for unlocking the lock. Therefore, when the users lose the key, they can use cellular phones to unlock the lock to open the door. The feedback module comprises a Hall device disposed on a side of the remote control extension and coupled to a sensing driving circuit unit, a magnet disposed at a side edge of a door corresponding to the Hall device for determining whether the door is opened by magnetic effect of the sensing driving circuit unit and the Hall device, a signal generated therefrom is transmitted to and processed by the processing unit, which is fed back to an original caller through the separate external addition-type remote control extension, the RF wireless transceiving unit of the host and the phone interface processing unit.

According to an embodiment of the present invention, the exemplary wall-hanging remote control extension is adapted for a gas switch. The exemplary wall-hanging remote control extension comprises a shell, a RF wireless transceiving unit, a processing unit, an address encoding unit, a charging and detecting unit, a switch driving module and a feedback module. The switch driving module comprises a switch driving circuit unit, a motor, a small gear fixed on the axis of the motor, the small gear gearing with a big gear, which is fixed at a bottom of a spring stick, a lateral enabling stick fixed at the bottom of the spring stick. The lateral enabling stick is movable along a U-trench between a manual gas switch and the big gear. When the RF wireless transceiving unit receives a remote switching signal from the remote control host, the remote switching signal is transmitted to and processed by the processing unit for generating a control signal, which passes through the switch driving circuit unit to the motor for rotating a proper angle as to rotate the lateral enabling stick and the manual gas switch for a proper angle for turning off the gas switch or for turning on the switch. Therefore, when the user forget to turn off the stove, the user can use a cellular phone to turn off the gas switch thereof. The feedback module comprises a Hall device disposed on a side of the remote control extension and coupled to a sensing driving circuit unit, a magnet disposed at a side edge of a door corresponding to the Hall device for determining whether the door is opened by magnetic effect of the sensing driving circuit unit and the Hall device, a signal generated therefrom is transmitted to and processed by the processing unit is fed back to an original caller through the separate external addition-type remote control extension, the RF wireless transceiving unit of the host and the phone interface processing unit.

In order to make the aforementioned and other objects, features and advantages of the present invention understandable, a preferred embodiment accompanied with figures is described in detail below.

DESCRIPTION OF EMBODIMENTS

Figure 1:
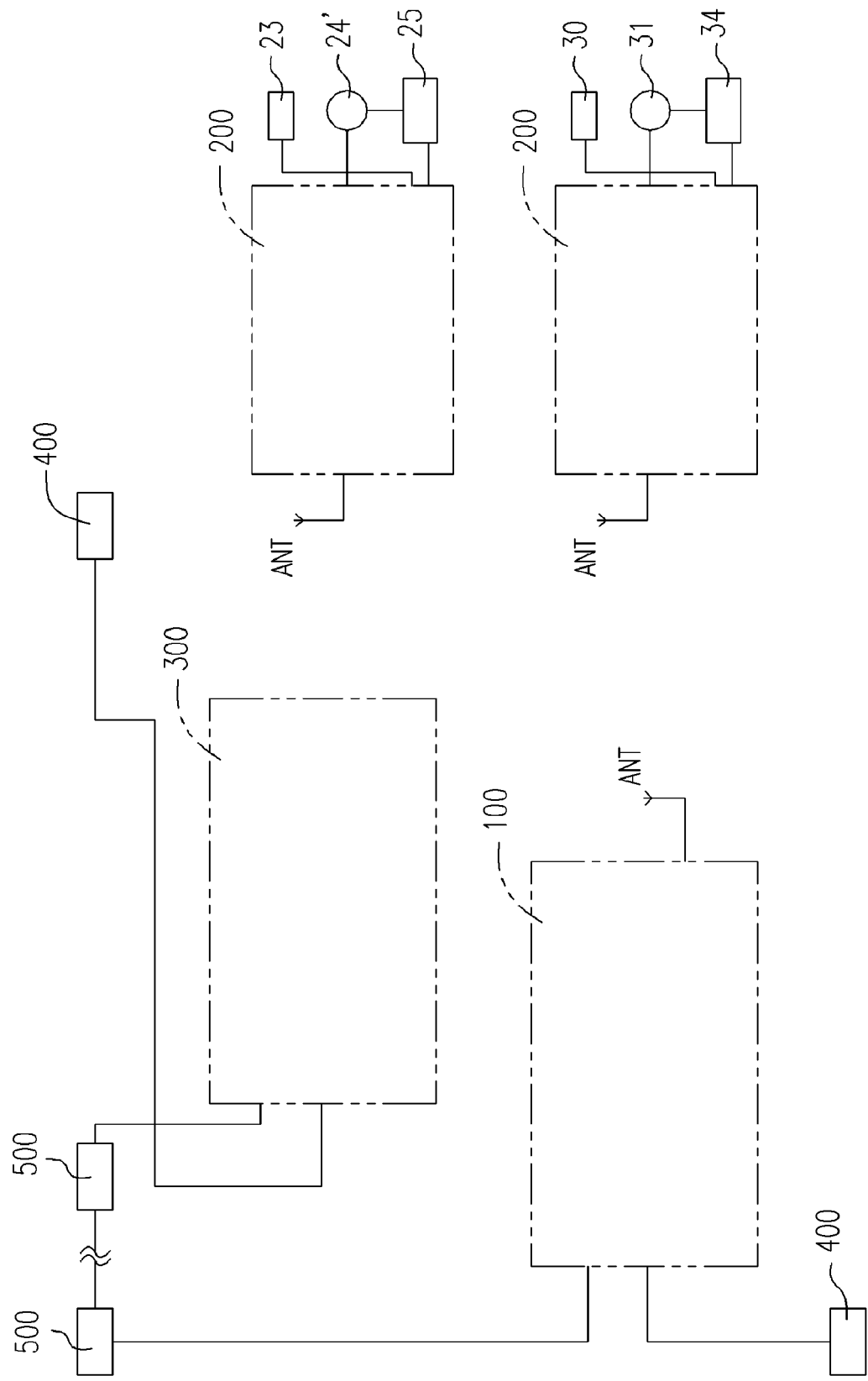
FIGS. 1 and 1A–1D are block diagrams showing the exemplary external bilateral telephone interface remote control system of the present invention.
Figure 1A:
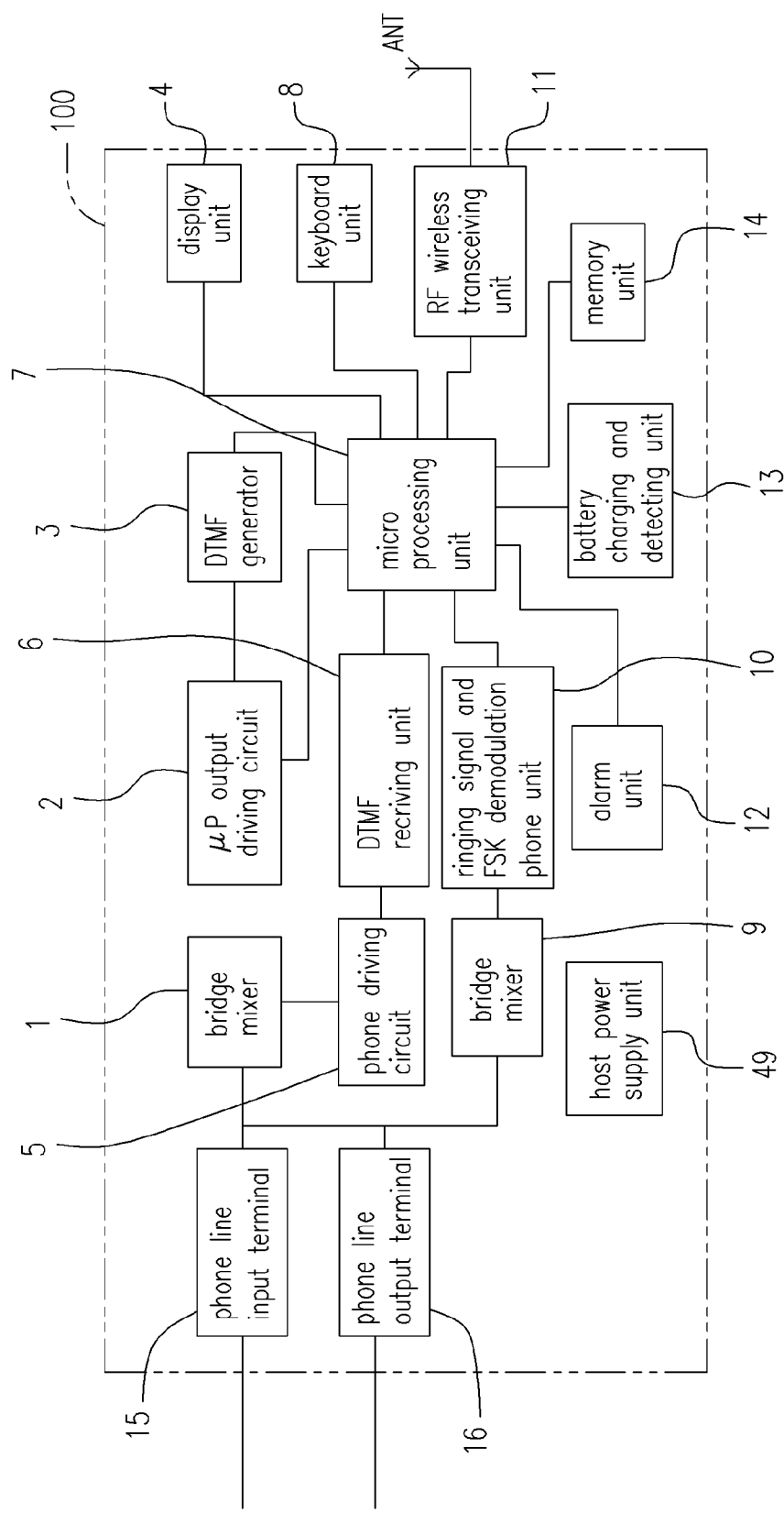
Figure 1B:
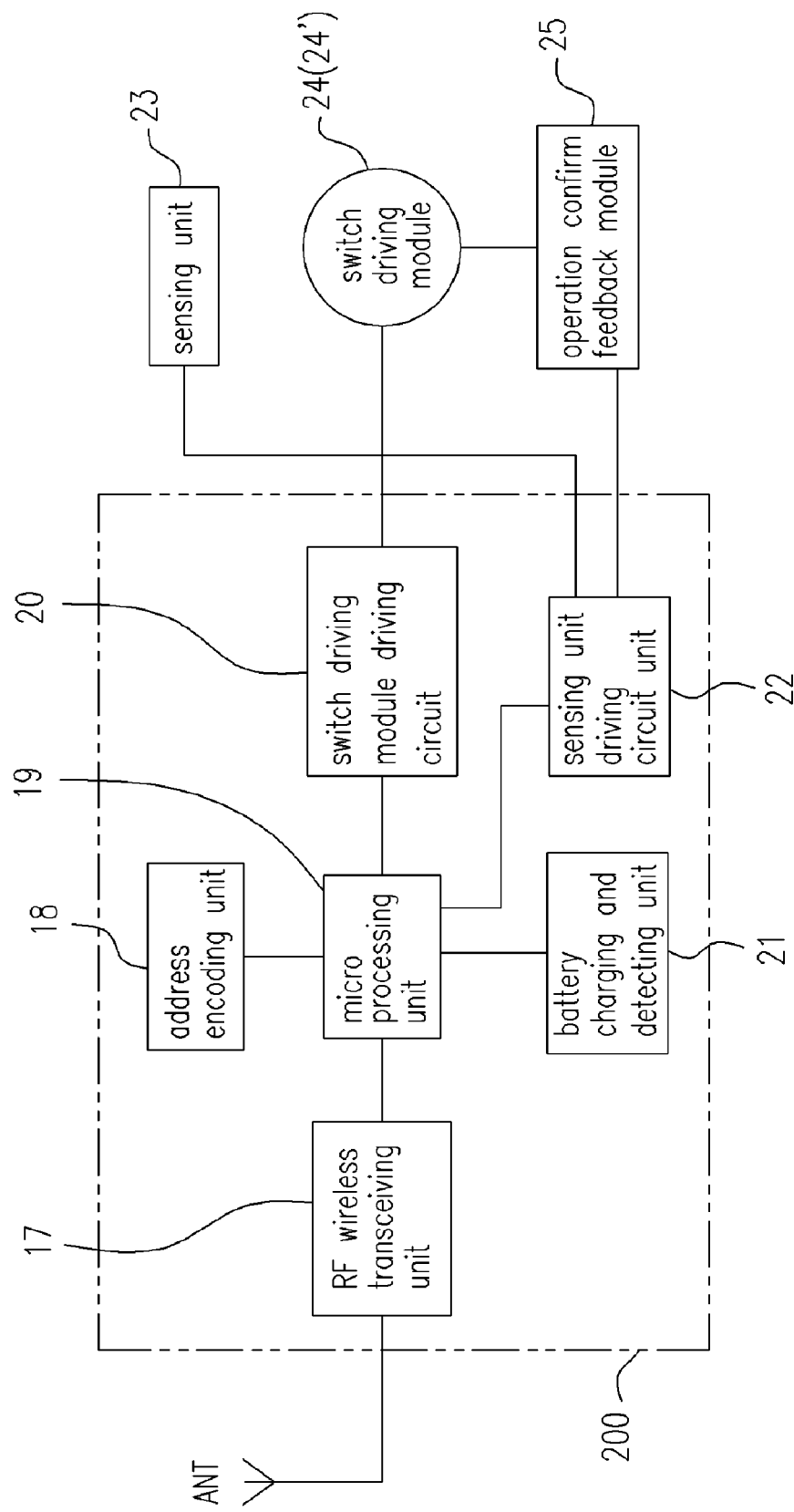
Figure 1C:
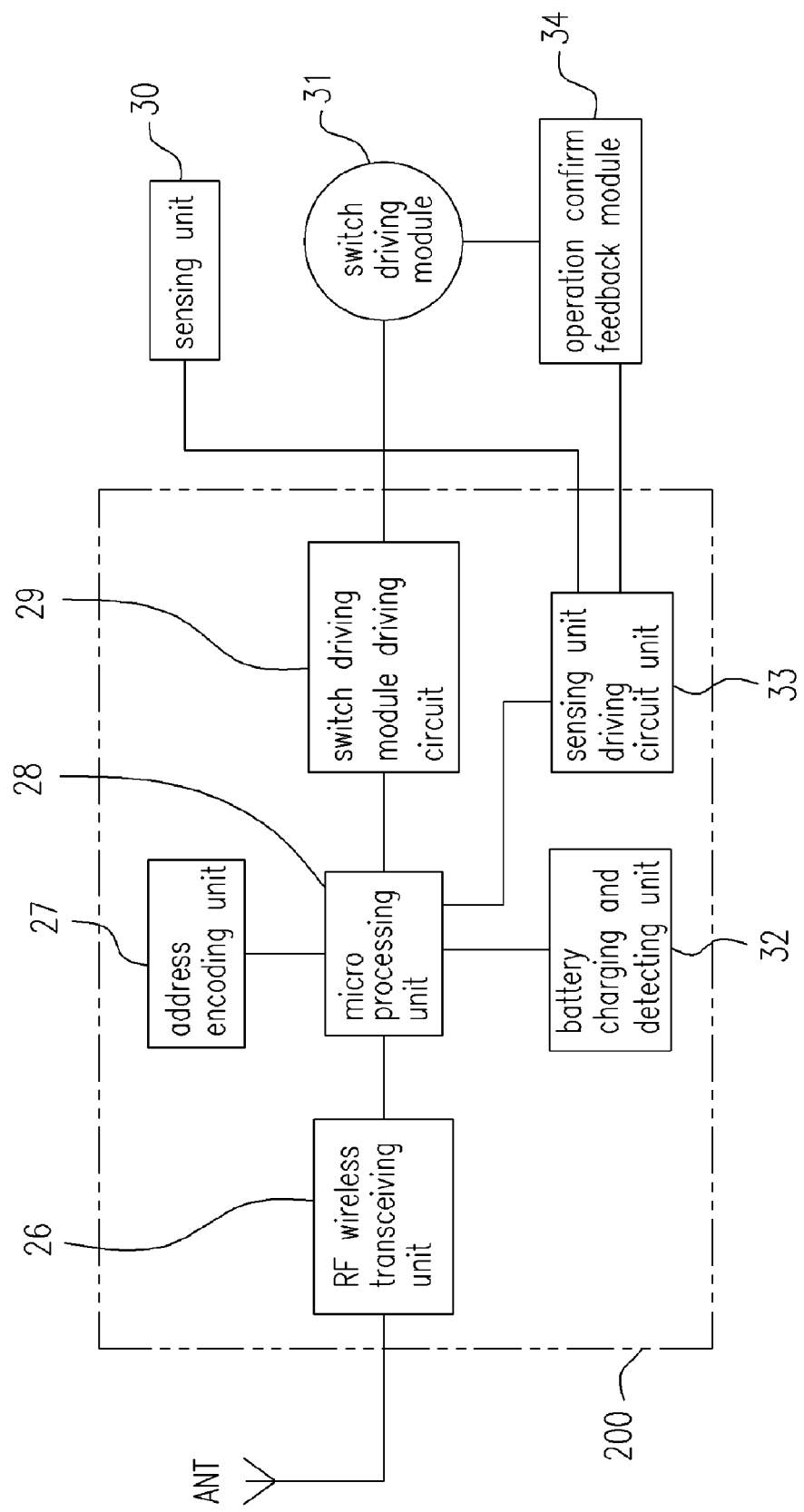
Figure 1D:
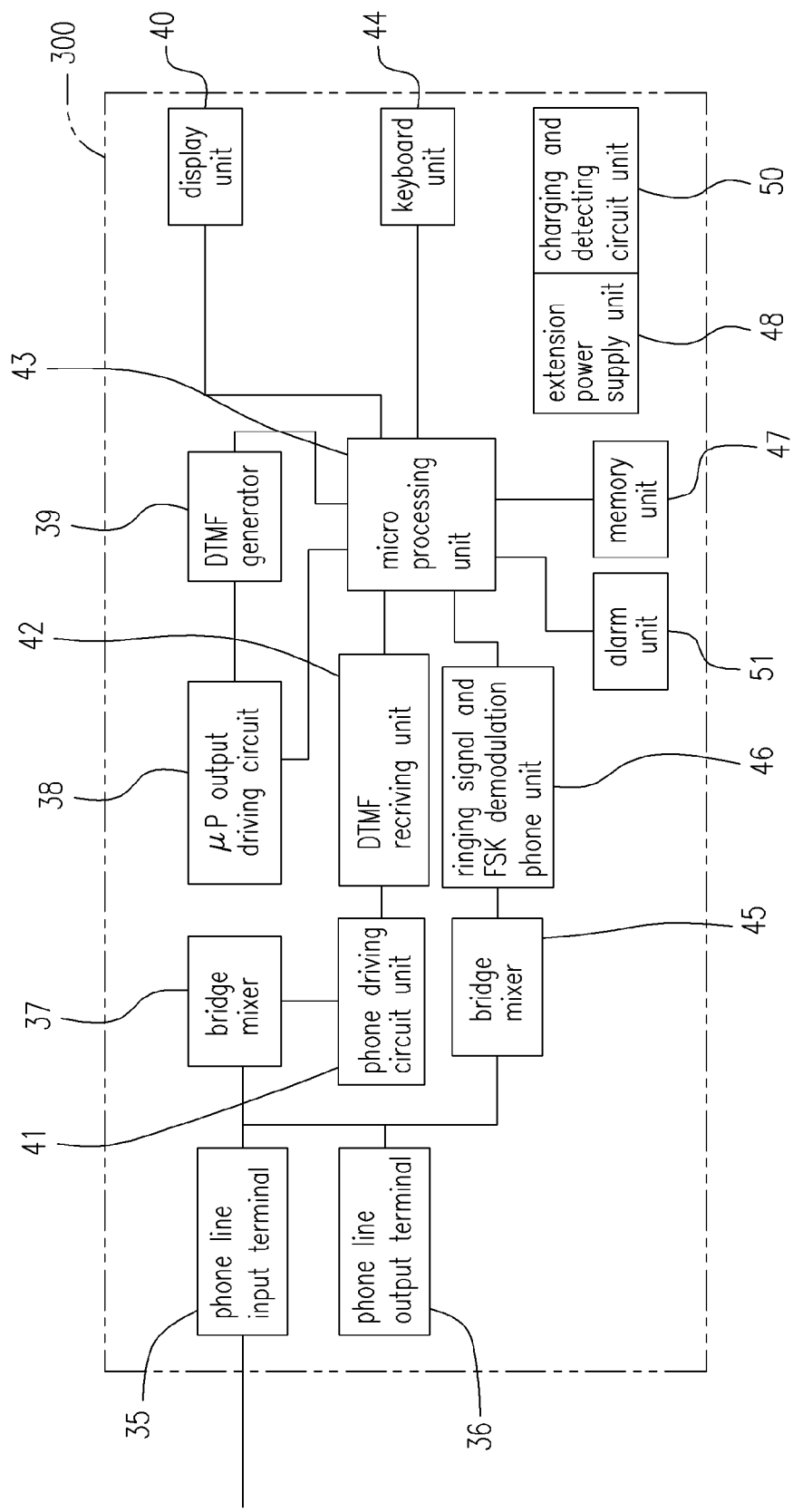

FIGS. 1, and 1A–1D are views illustrating an external bilateral telephone interface remote control system according to a first embodiment of the present invention. The external bilateral telephone interface remote control system comprises an external remote control host 100, indoor or outdoor phone lines 15 and 16 and an separate external addition-type remote control extension 200 of an indoor wire or wireless switch indoor. The external remote control host 100 has an input terminal coupled to indoor or outdoor phone lines 15 and 16 and an output terminal coupled to the separate external addition-type remote control extension 200 of the indoor wire or wireless switch indoor. Thus, a remote control network is being constructed for controlling the wire or wireless switch via phone. Therefore, the user can remotely activate the wireless or wire device in the factory or the interior facilities of the factory or a house. The external remote control host 100 comprises a phone interface processing unit having two bridge mixer 1 and 9, a phone driving circuit unit 5, a DTMF receiver 6, a DTMF generator 3, a memory unit 14, a processing unit 7, a display unit 4 and a RF wireless transceiving unit 11. The DTMF generator is adapted for processing and receiving phone signals. The memory unit 14 is adapted for storing a preset remote control code. The processing unit 7 is adapted for identifying and processing a control signal from the phone line. The display unit 4 is adapted for displaying a power situation of the separate external addition-type remote control extension. The RF wireless transceiving unit 11 is adapted for receiving and transmitting correct control signals from the processing unit 7 and a RF wireless transceiving unit 26 of the separate external addition-type remote control extension 200. The separate external addition-type remote control extension 200 comprises a processing unit 28, a switch driving module 24 or 31, an address encoding unit 18 or 27 and a feed back module 25 or 34. The processing unit 28 is adapted for identifying and processing a remote control signal from the RF wireless transceiving unit 26 of the separate external addition-type remote control extension and the feedback signal from the feedback module 25 or 34. The switch driving module 24 or 31 is adapted for turning on or off the wire or wireless switch according to the remote control signal from the processing unit 28. The address encoding unit 18 or 27 is adapted for encoding the on or off of the switch. The feed back module 25 or 34 is adapted for generating a feedback signal thereby performing the bilateral remote control via the remote control network and the phone line.

According to a second embodiment of the of the present invention, the aforementioned the external remote control host 100 of the first embodiment of the external bilateral telephone interface remote control system further comprises a power supply 49 and a charging and detecting unit 13 disposed between the processing unit and the power supply.

According to a third embodiment of the present invention, the aforementioned external remote control host 100 of the external bilateral telephone interface remote control system described in the first embodiment further comprises a keyboard unit 8 coupled to the processing unit 7.

According to a fourth embodiment of the present invention, the aforementioned separate external addition-type remote control extension 200 of the external bilateral telephone interface remote control system described in the first embodiment further comprises a super display 300 comprising a phone interface processing unit 35 and 36, a memory 47, a processing unit 43, and a display unit 40. The super display 300 is adapted for receiving and transmitting a phone signal. The memory 47 is adapted for storing a preset remote control code. The processing unit 43 is adapted for identifying and processing a remote control signal. The display unit 40 is adapted for displaying an operation condition of wire or wireless equipment coupled to the separate external addition-type remote control extension.

According to a fifth embodiment of the present invention, the aforementioned super display 300 of the external bilateral telephone interface remote control system described the fourth embodiment further comprises a power supply 49 and a charging and detecting unit 50 disposed between the processing unit and the power supply 49.

According to a sixth embodiment of the present invention, the aforementioned super display 300 of the external bilateral telephone interface remote control system described in the fourth embodiment further comprises a keyboard unit 44 coupled to the processing unit 7.

Figure 15:
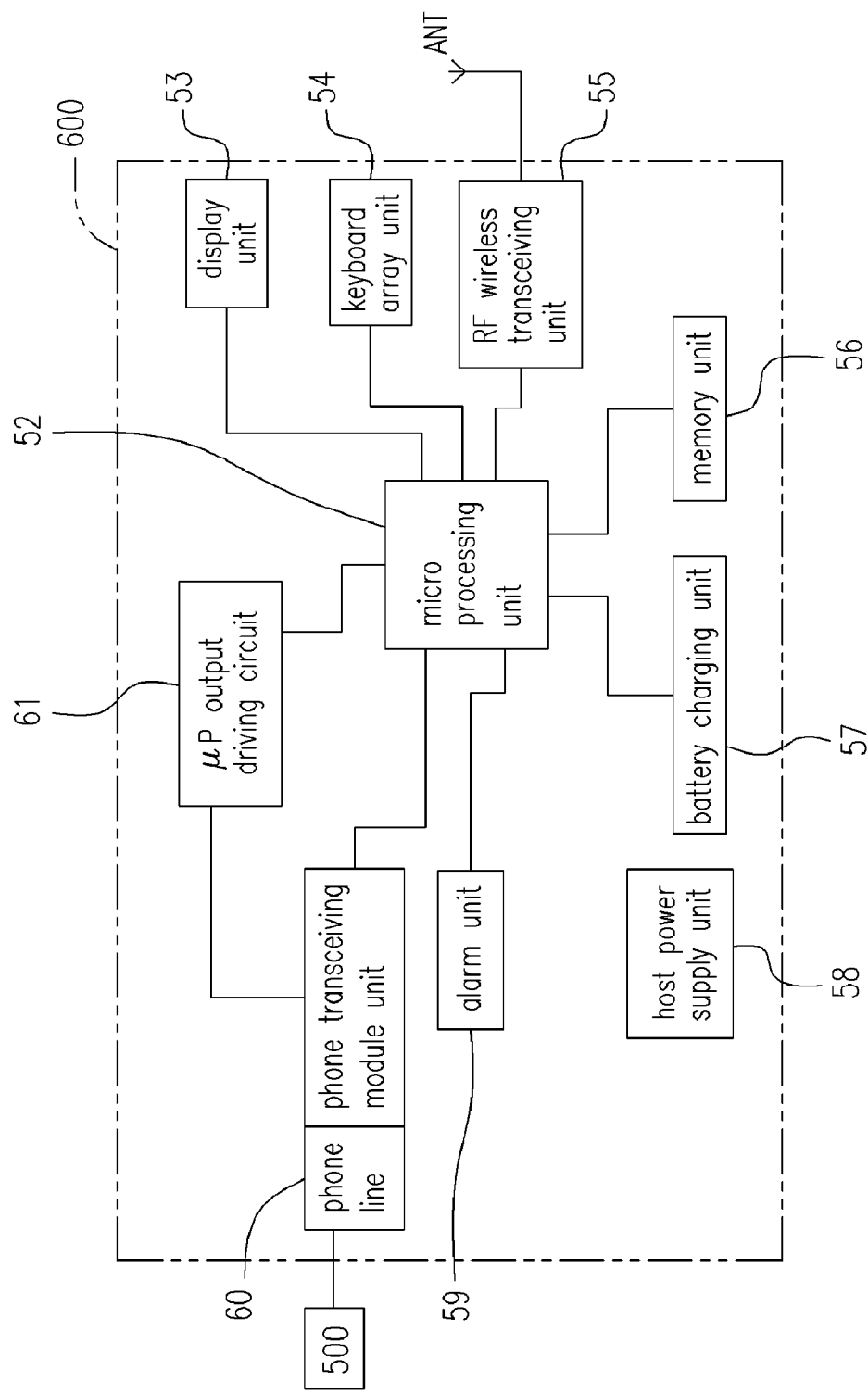
FIG. 15 is a block diagram of a host of an external bilateral telephone interface remote control system according to the seventh embodiment of the present invention.
Figure 16:
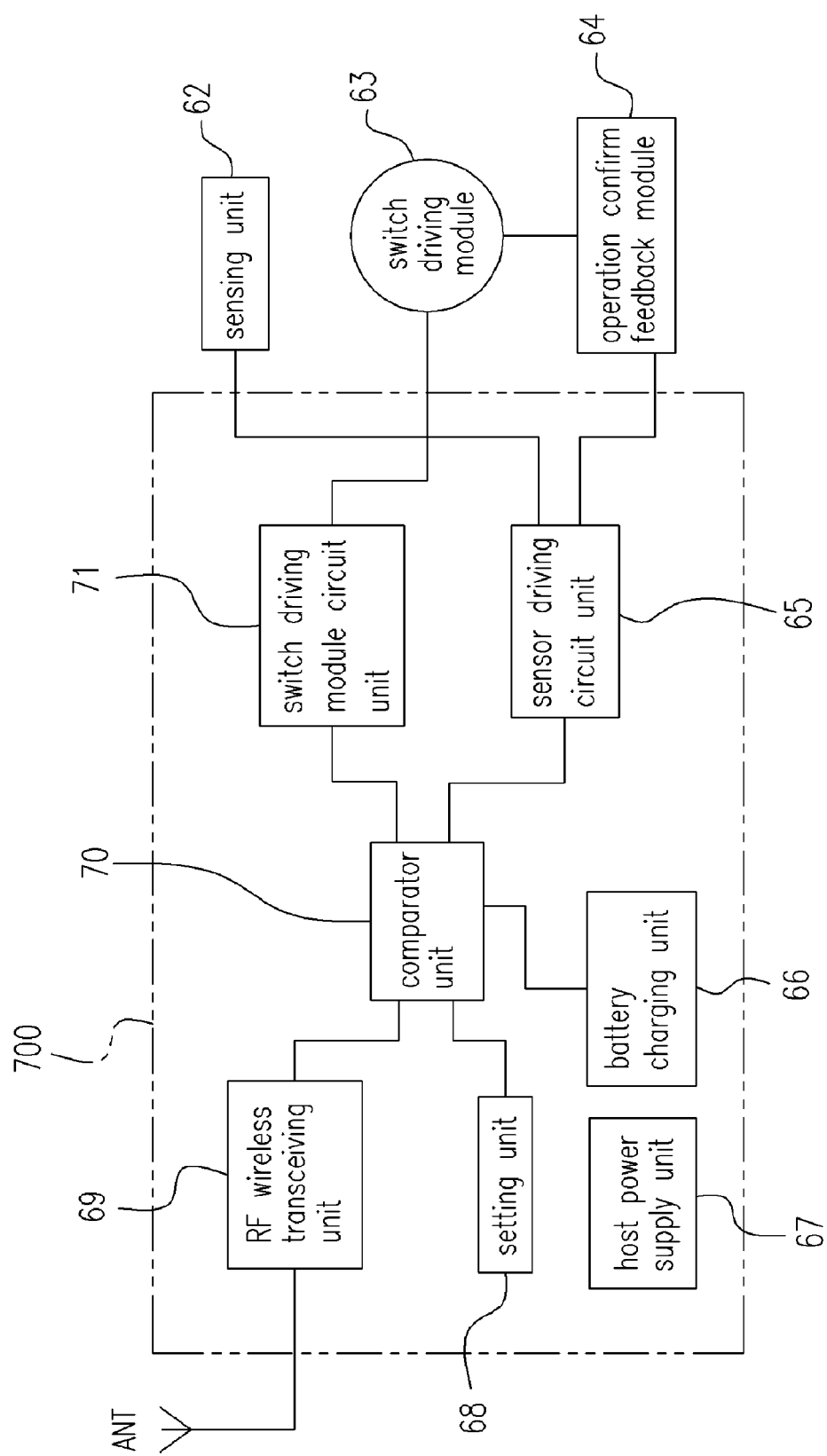
FIG. 16 is a block diagram of an extension of an external bilateral telephone interface remote control system according to the seventh embodiment of the present invention.

FIGS. 15–16 are the views illustrating a external bilateral telephone interface remote control system according to a seventh embodiment of the present invention. The system comprises an external remote control host 600. The external remote control host 600 has an input terminal coupled to an indoor or an outdoor phone line and an output terminal coupled to an separate external addition-type remote control extension 700 of a wire or wireless switch, such as power switch, magnetic switch, or gas switch. Thus, an indoor remote control network is being constructed for controlling the wire or wireless switch via phone. Therefore, the user can remotely activate the wireless or wire device in the factory or the interior facilities of the factory or a house. The external remote control host 600 comprises a phone transmitting module 60, a memory unit 56, a processing unit 52, a keyboard of the host and the extension, a display unit 53, a RF wireless transceiving unit 55, an alarm unit 57 and a processor outputting driving circuit unit 61. The phone transmitting module 60 is adapted for informing a remote super about any abnormal data detected by the sensing unit 62 and the switching driving module 63 of the separate external addition-type remote control extension through preset phone numbers and voice messages, and the remote super can input control signals via a keypad of a telephone or a mobile phone for control the activation of the wire or wireless equipment in the factory or the interior facilities of the factory or a house through bilateral telephone interface. The memory unit 56 is adapted for storing preset remote control codes, the control signals and feedback signals from a RF wireless transceiving unit of the extension. The processing unit 52 is adapted for identifying and processing the control signals from the phone line, a keyboard of the host and the extension. The display unit 53 is adapted for displaying a remote super about any abnormal data detected by the sensing unit 62 and the switching driving module 63 of the separate external addition-type remote control extension. The RF wireless transceiving unit 55 is adapted for receiving and transmitting correct control signals and feedback signals from the processing unit 52, the phone transmitting module 60 and a RF wireless transceiving unit 69 of the separate external addition-type remote control extension 700. The alarm unit 57 is adapted for sending out alarm signals. The processor outputting driving circuit unit 61 is adapted for triggering the RF wireless transceiving unit for controlling the operation of the extension.

The separate external addition-type remote control extension 700 (extension, hereinafter) comprises a comparing unit 70, a RF wireless transceiving unit 69, a sensing unit 62, a switch driving module 63, a sensing driving circuit unit 65, an extension charging unit 66, an extension power supply unit, an extension power supply 67, a setting unit 68, and a switch driving module 71. The comparing unit 70 is adapted for determining whether physical and chemical data measured by the sensing unit exceed the preset values so as to determine whether the switch driving module 63 should be turned on and whether a feedback signal should be transmitted to the host. The RF wireless transceiving unit 69 is adapted for receiving the control signals from the host and feedback signals transmitted to the host from the switch driving module. The sensing unit 62 is adapted for measuring the user's required physical and chemical data of temperature, pressure, concentration, wind or PH value, etc. The switch driving module 63 is adapted for driving the wire or wireless switch. The feed back module 64 is adapted to feedback a confirm signal for action of turning off or on the switch and to transmit the confirm signal via the remote control network and the external phone line to the super to achieve the bilateral telephone interface remote control. The sensing driving circuit unit 65 is adapted for transmitting physical and chemical data of temperature, pressure, concentration, wind or PH value measured by the sensing unit to the comparing unit. The extension charging unit 66 is adapted for immediately supplying power to the extension when an original power supplied thereto is turned off. The extension power supply unit is adapted for supplying powers thereto. The extension power supply 67 is adapted for supplying powers therein. The setting unit 68 is adapted for setting preset values for temperature, pressure, concentration, wind and PH value. The switch driving module 71 is adapted for triggering the switch driving module 63 to turn on or off the wire or wireless switch.

Following are the descriptions of the external remote control host 100. When a user makes a phone call, a phone station 600 transmits a ringing signal to the phone interface processing unit of the host 100 via the input terminal 15 of the phone line. Then the signal is transmitted to a phone through the output terminal 16 of the phone line. The phone interface processing unit comprises two bridge mixer 1 and 9, a phone driving circuit unit 5, a DTMF receiver 6 and a DTMF generator 3. After the signal enters into the input terminal 15 of the phone line, the bridge mixer 9 rectifies the AC signal and extracts the DC component, which is transmitted to a demodulator 10 for demodulating the ringing signal and the FSK signal in which the ringing signal and a CALL-ID signal are extracted. The FSK signal in the CALL-ID signal is demodulated by the demodulator 10 and the ringing signal is sent to the micro processing unit 7 for analysis.

After the ringing signal is received, the demodulated CALL-ID signal is received and analyzed. After receiving the CALL-ID is completed, the preset phone codes are searched from the memory unit 14 to perform a comparison. If the CALL-ID matches with the preset phone code, a control signal is sent to the phone driving circuit unit 5 to connect the phone line after several ringing signals have rung.

After the phone line is connected, the processing unit 7 transmits a confirmation signal to the dialing terminal via the output driving circuit unit 2, the bridge mixer 1 and the input terminal 15 of the phone line. The dialing terminal then transmits a code, an extension code and an operation code. The processing unit 7 accesses code data from the memory unit 14 to check whether the input code is correct. If the input code is correct, the extension code and the operational code are identified. If the input code is incorrect, the micro processing unit 7 cancels the control signal that is transmitted to the phone driving circuit unit 5 so as to hang up the phone battery.

When the input code is correct, the micro processing unit 7 accesses an extension code and an operation code from the memory unit 14 for comparison with the extension code and the operation code received. If the extension code and the operation code received are correct, the micro processing unit 7 transmits the extension code and the operation code by the RF wireless transceiving unit 11.

The micro processing unit 7 establishes a wireless network by calling the extension according to the extension code via the RF wireless transceiving unit 11. Because each extension has a corresponding extension code therein, the extensions themselves can automatically identify which one should respond the call. Therefore, only the proper one of them will respond to establish the wireless network.

When the extension and the host are connected, the operation code is transmitted to the extension by the RF wireless transceiving unit 11. After the micro processing unit 7 completes the transmission of the operation code, the RF wireless transceiving unit 11 is in a receiving mode for waiting a confirmation signal from the extension.

After the extension completes the operation, the extension feeds back execution state information to the RF wireless transceiving unit 11. After receiving execution state information, it is then transmitted to the micro processing unit 7 for determination.

After the micro processing unit 7 receives the feedback signal from the RF wireless transceiving unit 11, the micro processing unit 7 processes the signal in different modes according to the information content as shown in Table 1.

TABLE 1

| status | switch driving module (31) | operation confirm feedback module (34) | voltage check | system response mode |
|---|---|---|---|---|
| extension power low | — | — | failure | host alarms and displays the extension code. |
| incomplete driving | failure | failure | normal | failure feedback signal is sent to the dealing terminal. The micro processing unit 7 drives the alarm unit 12 for turning on a buzzer. |

TABLE 1-continued

| status | switch driving module (31) | operation confirm feedback module (34) | voltage check | system response mode |
|---|---|---|---|---|
| no response of equiptment | normal | failure | normal | failure feedback signal is sent to the dealing terminal. The micro processing unit 7 drives the alarm unit 12 for turning on a buzzer. |
| normal | normal | normal | normal | normal feedback signal is sent to the dealing terminal. The micro processing unit 7 drives the alarm unit 12 for turning on a buzzer. |

The micro processing unit 7 sends different signals (normal or failure) according to different feedback signals to the dialing terminal for identifying the operation status via the driving circuit unit 2, the bridge mixer 1 and the input terminal 15 of the phone line.

When the extension detects an abnormal status, the abnormal signal is transmitted to the micro processing unit 7 for identification via the RF wireless transceiving unit 11.

When the RF wireless transceiving unit 11 of the host receives the signal from the extension, the signal is reversed to original code data, which is then analyzed by the micro processing unit 7. The coding process is processed according to a preset process mode.

The micro processing unit 7 accesses data previously stored in the memory unit 14 and searches a new order code. The order code comprises following actions.

A. Transmitting a control signal wirelessly to turn on or off one or more extensions;

B. sending an alarm; and

C. extracting the pre-stored phone number from the memory unit 14 to operate the DTMF generator 3 for generating the DTMF signal through the driving circuit unit 2. The DTMF signal is then enhanced and transmitted to the bridge mixer 1 and the phone line for dialing the phone number. After dialing, feedback information is transmitted.

When the RF wireless transceiving unit 11 of the host receives the signal, the signal is transmitted to a computer for analysis. If a power-low situation is determined, an alarm signal is transmitted to the alarm unit 12 for generating an alarm sound to acknowledge the nearby operators. The operators can then press the switch button ON/OFF to turn off the alarm unit 12 and to check which extension is in the power-low status by checking the display pf displayed in the monitor. Therefore, the extensions can be timely replaced or maintained to make sure of their normal operations.

The host power supply 49 supplies power to the host system from an external AC/DC power source AC/DC. The host power supply 49 comprises a processing unit 7805 serving as a 5-V voltage regulator.

The charging and detecting unit 13 can charge batteries by using the external AC/DC power or the power of the phone line.

Following are the descriptions regarding the applications of the present invention to a lock or a gas source switch.

The wireless remote-controlled extension hooks up with the host for executing the order therefrom and detecting the execution status of the operation thereof. The operation result of equipment will be fed back to the host whether the operation result is normal or not.

After the RF wireless transceiving unit 26 of the extension receives host information, the micro processing unit 28 performs a data determination process and then transmits a control signal to the switch driving circuit unit 29 for driving the switch module 31 as to control the switch of equipment, such a house lock or a switch of a gas source. The extension of the present invention has a feedback module 34 for confirming the operation, adapted to identify whether the operation position of the switch driving module 31 reaches the proper position. The detected status of the operation position is then fed back to the driving circuit 33 for rising a potential level, which will be further fed back to the processing unit 28 for identification. The micro processing unit 28 will operate according to the signal received therefrom as below:

(1) When the operation of the switch driving module is incomplete, the processing unit 28 performs encoding according to the address encoding unit 27, and then adds an operation-incomplete code that will be sent to the host via the RF wireless transceiving unit 26.

(2) When the power switch, lock, or gas switch does not respond, a non-response code is added thereto and sent to the host via the RF wireless transceiving unit 26.

(3) When the operation is normal, a normal operation code is added and the above switch normal operation code is added, which are sent to the host via the RF wireless transceiving unit 26.

The main function of the sensing unit 34 of the extension detects whether the operation of the switch driving module 31 is normal or not. When the "ON" position is away from the normal position due to the switch operation, the switch has to be moved back to the normal position after the switch operation in order to make sure that the switch can be properly operated.

The main function of the sensing unit 30 of the extension is to identify whether the operation of the switch driving module 31 achieves its expected result after the switch driving module 31 completes its operation.

Because the present invention provides a bilateral wireless system, the host and each extension are connected by a wireless network so as to reflect and control the operation status of each extension. The system of the present invention provides correct information to the user by using the phone line, and this cannot be achieved by other conventional systems.

The micro processing unit 28 regularly detects status of the battery charging and detecting unit 32. When the extension is in power-low status, the micro processing unit 28 will change the status of the battery charging and detecting unit 32. Therefore, when the micro processing unit 28 detects the status change, the micro processing unit 28 will encode and generate a power-low code according to the address encoder unit 27, wherein the power-low code is then sent to the host via the RF wireless transceiving unit 26, according to the address encoding unit 27.

When the micro processing unit 28 regularly detects status of the battery charging and detecting unit 32 and shows normal status, the micro processing unit 28 will encode and call the host according to the address encoder unit 27, so as to prevent the host from being determined as disconnection.

The extension can use the charging and detecting unit 13 to charge the batteries using the external AC/DC power or the phone-line power for extending the operation time of the extension of the present invention.

The processing unit 28 regularly detects the power status of the charging and detecting unit 32. When the extension is in the power-low status, it will change the status of the charging and detecting unit 32. The processing unit 28 will encode and generate a power-low code, which is sent to the host via the RF wireless transceiving unit 26, according to the address encoding unit 27.

Following are the descriptions of the applications of the present invention to a power switch of a mechanical equipment.

Compared with the last embodiment, the difference is the detection function of the sensing unit. The sensing unit 30 of the last embodiment serves for identifying whether the operation of the switch driving module is a correction operation; the sensing unit 30 of this embodiment serves for: (1) passively introducing the external testing signal; or (2) actively testing external circumstances, and feeding back the conditions to the host via the telecommunication to make the host to execute related operations. Moreover, the extension of this embodiment can perform external action according to the signals from the host.

When the sensing unit 23 receives an abnormal signal, the abnormal signal will be transformed into a signal accessible to the micro processing unit 19 via the sensing driving circuit unit 22. After the micro processing unit 19 receives the signal, the micro processing unit 19 encodes and generates encoded information according to the address encoding unit 18, and then encoded information sent out by the RF wireless transceiving unit 17.

The RF wireless transceiving unit 17 and the host form a wireless network. When the host calls, the extension receives calling information from the host via the RF wireless transceiving unit 17. If the extension is matches with the address code, the processing unit 19 sends out a driving signal via the driving circuit unit 20 for driving the switch driving module 24 and the action-ascertained feedback module 25 detects and identifies whether the operation of the switch driving module 24 is correct. During a preset period of time, the detected operation signal is transmitted from the processing unit 19 to the host via the RF wireless transceiving unit 17.

The battery charging and detecting unit of the extension of the present invention is a battery charging circuit unit composed of R and D, which charges the batteries by the battery charging and detecting unit 13 through the external AC/DC power or the phone-line power.

The processing unit 19 regularly detects the power status of the batteries via the battery charging and detecting unit 21. When the voltage of the batteries is lower than 80%, the processing unit 19 detects power-low information and encodes power-low information, which is then transmitted to the host via the RF wireless transceiving unit 17.

When the host call back, super display unit 300 and the phone 400 receive the ringing signal at the same time because the super display unit 300 is disposed between the phone line and the phone 400. The super display unit 300 compares the Call-ID code of the host and the preset phone code. If they are matched, the phone is connected for waiting the identified signal. After receiving status information from the host, the super display unit 300 waits for the DTMF encoding signal of the host.

If the host setting system has a super display unit, after the host sends out the identified signal and the DTMF encoding signal, and the display unit displays the operation status of the extensions thereon.

The super display unit has a keyboard, adapted to input orders, passwords and information. Accordingly, the operators can input signals via the phone lines to the host by controlling the super display unit for performing remote control.

Followings are descriptions of the operation of the super display unit 300.

The ringing signal transmitted from the phone station 600 to the super display unit is transmitted to the phone interface processing unit of the super display unit 300 via the input terminal 35 of the phone line, and then to the phone 400 via the output terminal 36. The phone interface processing unit comprises two bridge mixers 37 and 45, a demodulator unit 46 for the ringing and the FSK signals, a phone driving circuit unit 41, a DTMF receiver 42, and a DTMF generator 39, etc. After the ringing signal entering the input terminal 35 of the phone line arrives at the bridge mixer 45, the bridge mixer 45 rectifies the AC component, which is then transmitted to the demodulator 46 for demodulating the ringing signal. The Call-ID is demodulated by the FSK signals. Then these two signals are transmitted to the micro processing unit 43.

After receiving the ringing signal and the ringing signal form the FSK demodulator 46, the micro processing unit 43 immediately receives the demodulated FSK signal. After the receiving is complete, the micro processing unit 43 read data stored in the memory unit 47, and then compares the received codes therewith. When the Call-ID code matches with the preset code, the micro processing unit 43 transmits a signal to the phone driving circuit unit 41 to hang on the phone.

After the micro processing unit 43 establishes the connection via the phone driving circuit unit 41, the micro processing unit 43 receives an identified signal via the bridge mixer 45 and the demodulator 46. Then the micro processing unit 43 starts timing. If the host does not respond DTMF status information during a preset period of time, the micro processing unit 43 cancels information to be sent to the phone driving circuit unit 41, and then the phone call is disconnected.

Before the micro processing unit disconnects the phone call, the host has sent out a DTMF encoding signal to the DTMF receiver 42 for decoding via the bridge mixer 37 and the phone driving circuit unit 41, and then to the micro processing unit 43 for analysis. When determining the ending code from the host, the micro processing unit 43 compares the received code with the status code list stored in the memory unit 47. If the received code matches with a code of the status code list, the micro processing unit 43 sends out the identified signal to have the host to disconnect the phone call via the processing output driving circuit unit 38, the bridge mixer 37 and the output terminal 35 of the phone line. If none of them are matched, the micro processing unit 43 sends out a re-transmitting signal have the host to re-transmit the signal. If the failure is repeated for several times, the phone call will be disconnected automatically, and the alarm unit 51 generates warning to the super.

When the micro processing unit 43 confirms status code information is correct, the micro processing unit 43 accesses the memory unit 47 for extracting pre-stored display information. Display information is then transmitted to the display unit 40 for displaying status.

The display unit 40 can use a LCD module to display, which can have a large LCD panel or a backlight. The micro processing unit 43 sends out information, including words and figures, and control signals via the I/O pins, such as DATA, STRORE, CLOCK, CS, etc. for control the display. The super display unit 300 can use external or AC/DC powers for automatically charging batteries for operation to prevent power failure.

The battery charging and detecting unit 50 can charge the batteries with the external AC/DC powers or the phone-line powers.

The key board unit includes ten number keys 0–9 and four special keys, including (1) alarm canceling key, (2) phone setting key, (3) order setting key and (4) extension setting key for setting. Several input settings can be made by using the four special keys. For example, the "*" key is used to select an order; and the "#" key can function as an "Enter" key. When alarm occurs, the super can press the alarm canceling key for turning off the alarm.

When the user dials the phone number and presses the "#" key, the micro processing unit accesses the memory unit 47 for extracting the pre-stored phone extension numbers and operation codes, which are sent to the DTFM generator 39 for DTMF encoding. Then the signals are sent to the host via the processing output driving circuit unit 38, the bridge mixer 37, the output terminal of the phone and the phone.

The phone station 600 transmits the ringing signal to the host. After calculating a delay, the codes, the phone station 600 transmits the extension numbers and the order codes, and then waits for a confirmation signal from the host.

After sending out the extension numbers and operation codes, the micro processing unit 43 waits for the feedback signal from the host and starts timing. If the host does not respond within a preset period of time, the phone call is disconnected. The micro processing unit 43 then drives the alarm unit 51 for a short time alarm sound, e.g., several seconds, to acknowledge the super and, sends a signal to the display unit 40 to show an "ERROR" message thereon.

Following are the descriptions of the operation of the extension 700 of the embodiment of the preset invention.

When the sensing unit 62 detects chemical or physical abnormal data of the equipment in the factory or electric appliances in the house, abnormal data is transmitted to the comparator unit 70 via the sensor driving circuit unit 65, wherein abnormal data is compared with the limit values preset in the setting unit 68 so as to determine whether the switch driving circuit unit 71, the switch driving module 63 and the RF wireless transceiving unit 69 should be triggered.

If abnormal data detected by the sensing unit 62 exceeds the preset values, the comparator unit 70 triggers the switch driving circuit unit 71 and the switch driving module 63 for turning off the power of the equipment. Meanwhile, abnormal data detected by the sensing unit 62 is transmitted via the data transmitting circuit unit 76 and the micro processing circuit unit 72 of the RF wireless transceiving unit 69. Then the RF wireless transceiving circuit unit 74 is changed into a transmitting mode and an encoded feedback signal is transmitted to the RF wireless transceiving unit 55 of the host 600 and the micro processing unit 52 via the transceiving circuit unit 73 by setting the RF address codes.

When the super intends to use a keypad of a cellular phone or a toll phone to control the extension 700, an order sent by the remote super can be transmitted via the host phone module unit 60, the micro processing unit 52, the RF wireless transceiving unit 55 of the host and the RF wireless transceiving unit 69 of the extension. Because the RF wireless transceiving unit 73 is normally in a receiving mode, the RF wireless transceiving unit 73 can receive the signals from the RF wireless transceiving unit 55 of the host. Then the signals are sent to the comparator unit 70 of the extension via the RF wireless transceiving processing circuit unit 72 and the data transmitting circuit unit 76. Then the switch driving circuit unit 71 and the switch driving module 63 are triggered to control the switch of the equipment. An action-confirm feedback signal generated from the action-confirm feedback module 64 is sent to the host whether the switch is turned on or off.

Following are the descriptions of the operation of the host 600 of the embodiment of the preset invention.

When the extension 700 change the status of the RF wireless transceiving circuit unit 74 into the transmitting mode via the RF wireless transceiving unit 69, the micro processing circuit unit 72 and the data transmitting unit 76, the transmitting circuit unit 73 sends a feedback signal to the RF wireless transceiving unit 55 and the micro processing unit 52 of the host 600 by the setting 75. The processing unit 52 sends the operational status of the extension to the display unit 53 so that the management can be informed immediately by the data detected by the sensing unit 62 and the operation of the switch driving module 63. Meanwhile, it triggers the alarm unit 59, sending out warning to the workers, and the phone module 60, sending out at least one preset phone number. By making a phone call via the phone module 60 to the management, the management is informed via the phone company terminal 500. The remote management can input order via the key board unit 54 of the main frame through the processing unit 54, or by a cellar phone or a toll phone through the phone company terminal 500, the phone dialing module 60 and the processing unit 52. The signals are transmitted to the RF wireless transceiving unit 69 of the extension via the RF wireless transceiving unit 55. Because the RF wireless transceiving unit 73 is normally in receiving mode, it can immediately receive the signals form the RF wireless transceiving unit 55. The signals are then sent to the comparing unit 70 via the RF wireless transceiving unit 72 and the data transmitting circuit unit 76. By triggering the comparing unit 70, the switch driving module 71 and the switch driving module 63, the switch of the equipment can be controlled. After the completion of the above operation, the action-ascertained feedback module of the extension sends the feedback signal to the main frame via the RF wireless transceiving unit 69. Therefore, the management can monitor the operation of the extension through the display 53, or the phone module unit 60 and the phone company terminal. The bilateral telephone interface remote control of the switch of the equipment in a factory or a house can be thus achieved.

FIGS. 1 and 4–7 are views illustrating an exemplary external wireless remote control extension 200 for a power switch of an equipment according to an embodiment of the present invention. The separate external addition-type remote control extension comprises a shell 201, having two legs 202 screwing on a switch 203 of equipment and having a set 205 that has two attaching trenches; a RF wireless transceiving unit 26; a micro processing unit 28; an address encoding unit 27; a battery charging and detecting unit 32; a switch driving unit 31 having a motor 311; a sensing unit 30 disposed at a proper place within the equipment; a sensor driving circuit unit 33 coupled to the sensing unit 30 and a switch driving module 31; an action-confirm feedback module 34 having a Hall device 341; and a remote super display unit 300 that is remotely disposed in another control room.

The super display unit 300 comprises a phone interface processing unit coupled to a phone line, wherein the phone interface processing unit comprises two bridge mixers 37 and 45, a demodulator 46 for the ringing and the FSK signals; a phone driving circuit unit 41, a DTMF receiver 42, a DTMF generator 39 (referring to FIG. 1D); a micro processing unit 43; a memory unit 47; a battery charging and detecting unit 50; a display unit 40; and a keyboard unit 44, etc. When sensing unit 30 detects an abnormal operation of the equipment, for example, operation temperature exceeding a preset value, the sensing unit 30 sends a signal to the micro processing units 28 and 7 of the extension 200 and the host 100, respectively. The micro processing unit sends out a control signal to switch driving module for turning off the power switch 203 of the equipment. Meanwhile, the micro processing unit also sends out a set of preset phone numbers to automatically dial to the super via the phone interface processing unit and the micro processing unit. Moreover, a display signal is transmitted to the display unit 40 for showing the equipment whose power is turned off, and a further process is required. According to a magnetic effect of the Hall device 341 of the action-confirm feedback module 34, one can confirm whether the operation of the power switch of the motor is complete.

Figure 2:
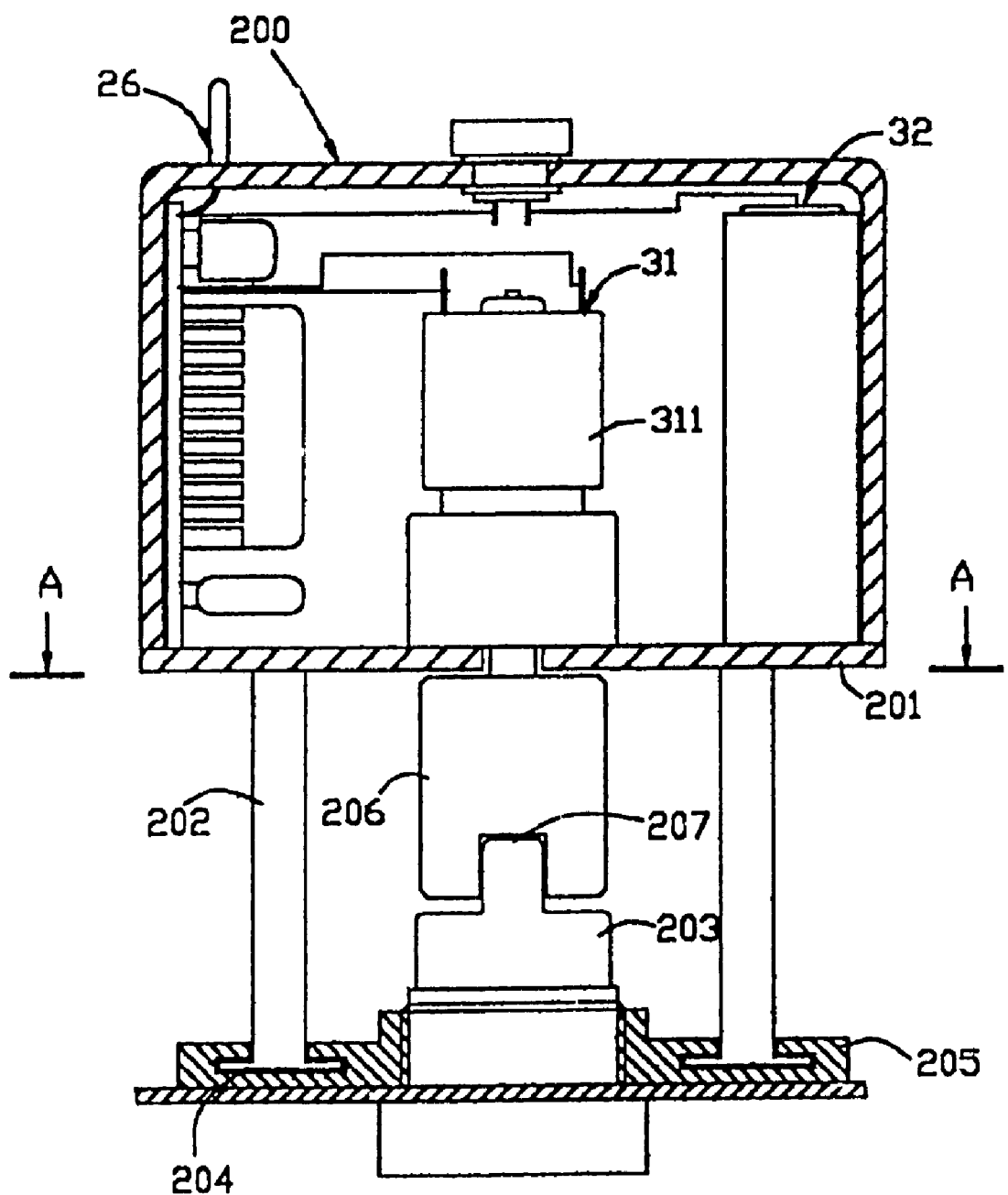
FIG. 2 is a cross-sectional view of an extension of an external bilateral telephone interface remote control system adapted for a factory according to an embodiment of the present invention.
Figure 3:
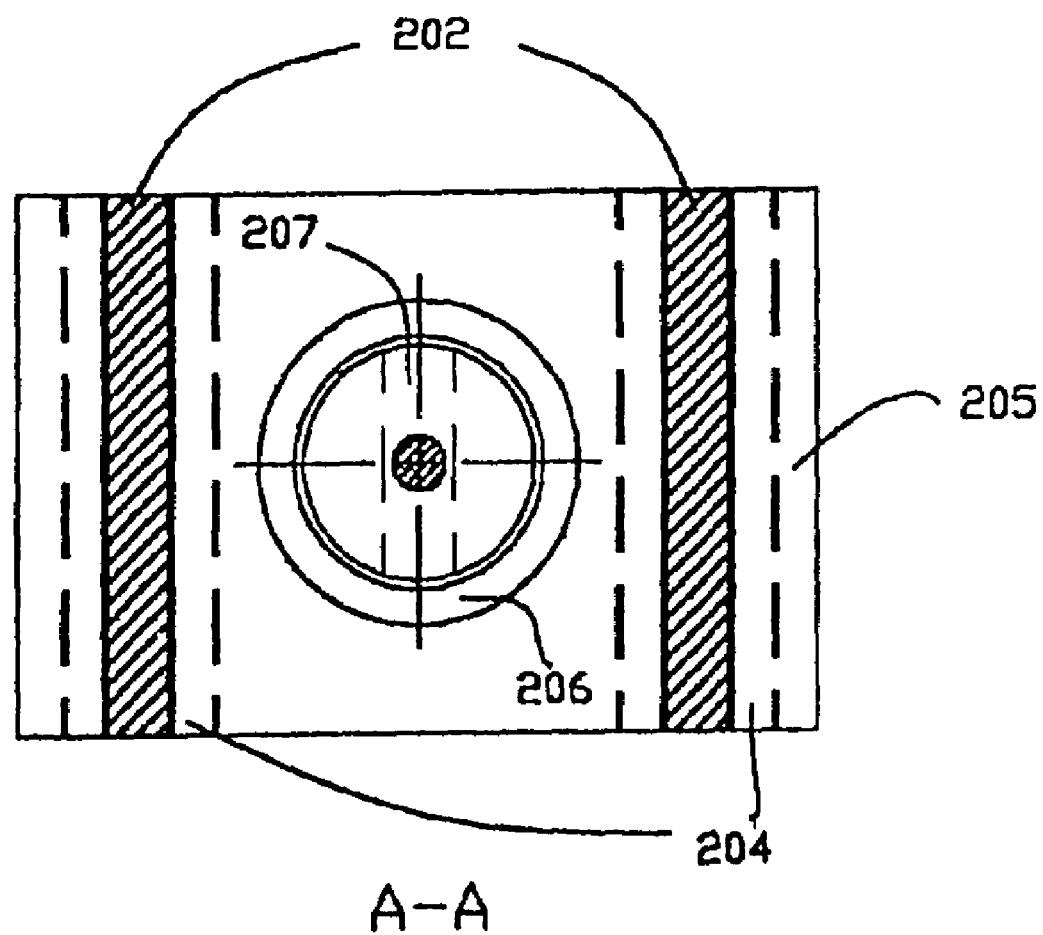
FIG. 3 is a cross-sectional view of an extension of an external bilateral telephone interface remote control system adapted for a factory along the line A—A of the FIG. 6 according to an embodiment of the present invention.
Figure 4:
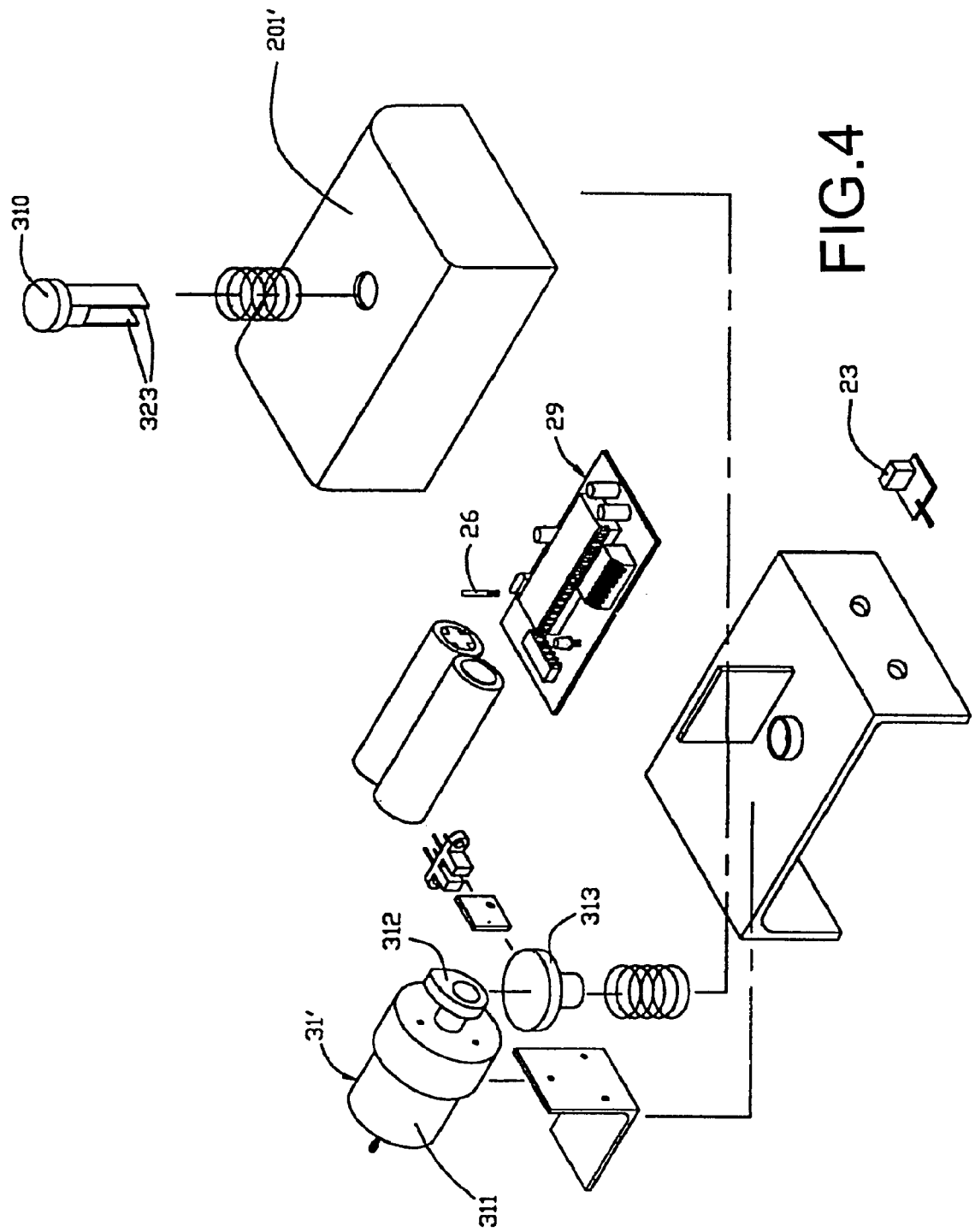
FIG. 4 is a drawing of an extension of an external bilateral telephone interface remote control system adapted for a lock according to an embodiment of the present invention.
Figure 5:
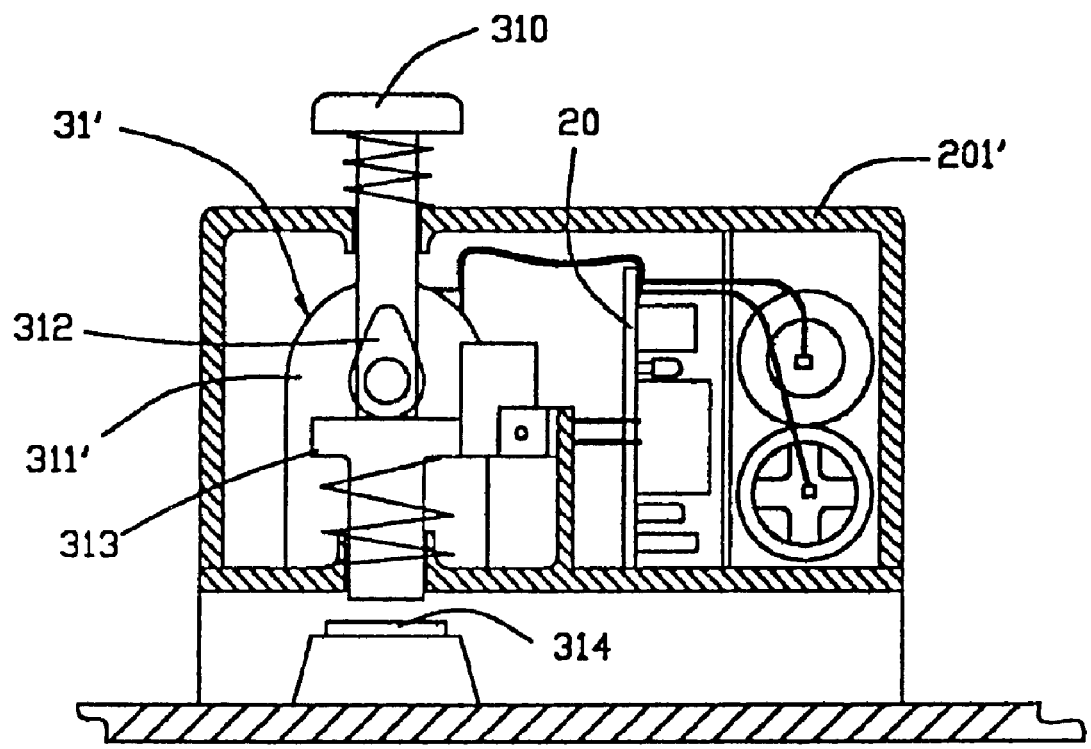
FIG. 5 is a cross-sectional view of an extension of an external bilateral telephone interface remote control system adapted for a lock according to an embodiment of the present invention.
Figure 6:
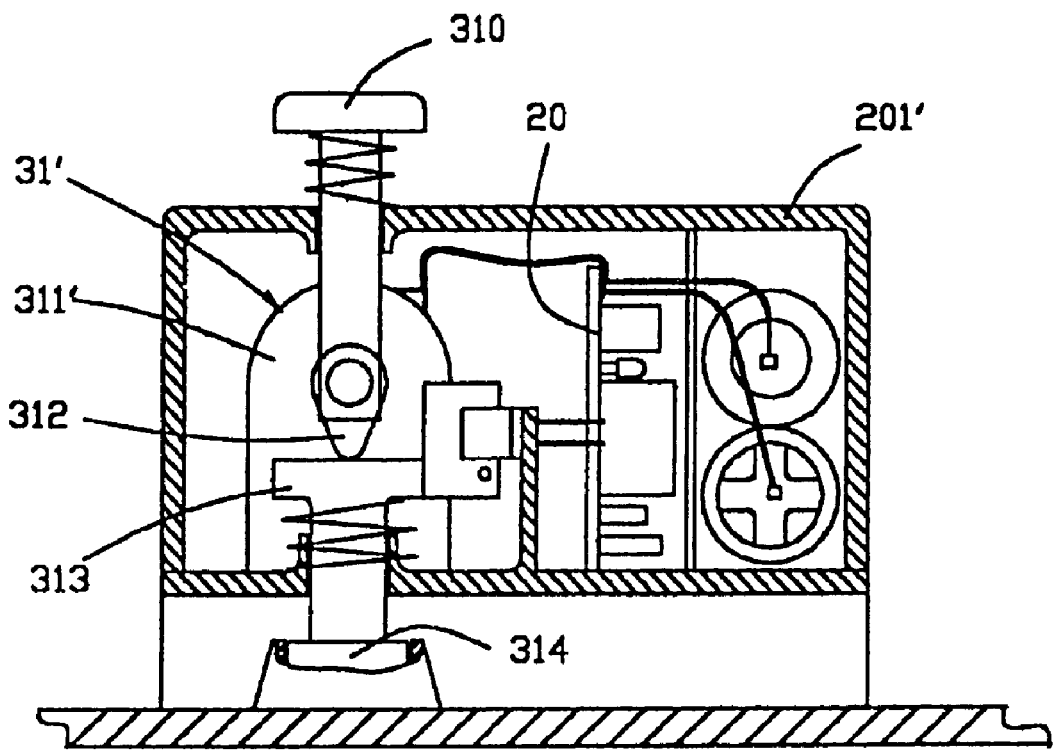
FIG. 6 is a cross-sectional view of an extension of an external bilateral telephone interface remote control system adapted for a lock according to an embodiment of the present invention in which the door is opened.
Figure 7:
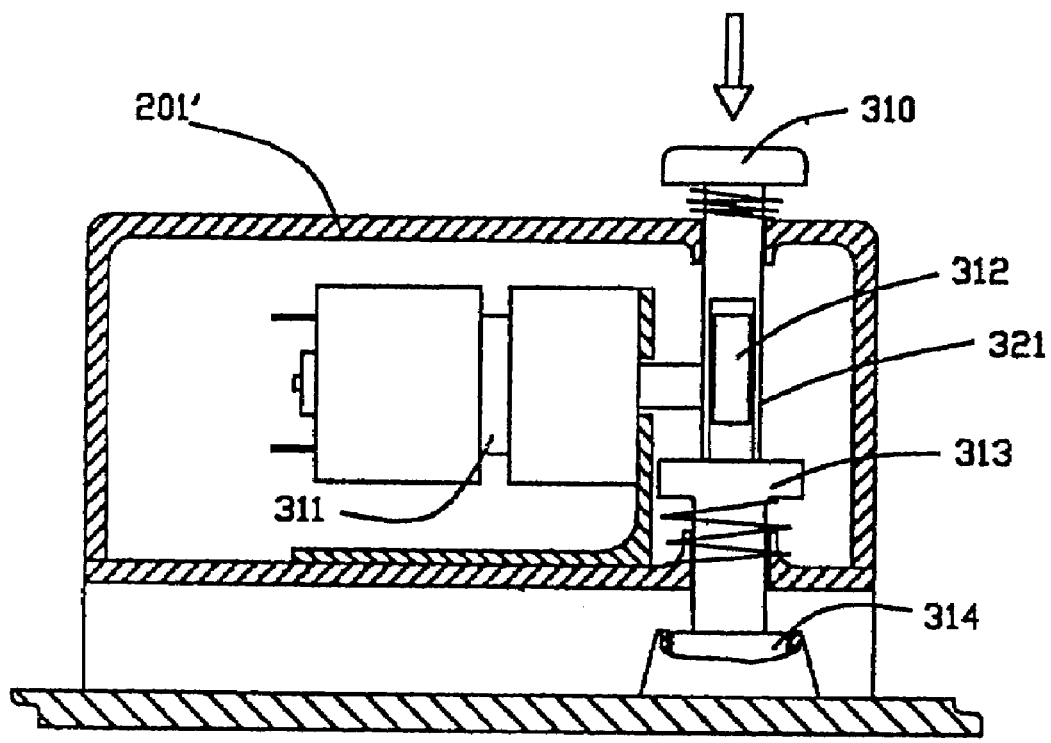
FIG. 7 is a cross-sectional view of an extension of an external bilateral telephone interface remote control system adapted for a lock according to an embodiment of the present invention in which the magnetic switch is pressed.

Referring to FIGS. 2 and 3, the shell 211 has the elements described above, wherein the axis of the motor 311 is attached a connector 206 downwards. The bottom of the connector 206 has a notch adapted to slip on a handle of the switch 203, so as to rotate the switch 203 to turn off the power while driving the motor 311.

Figure 8:
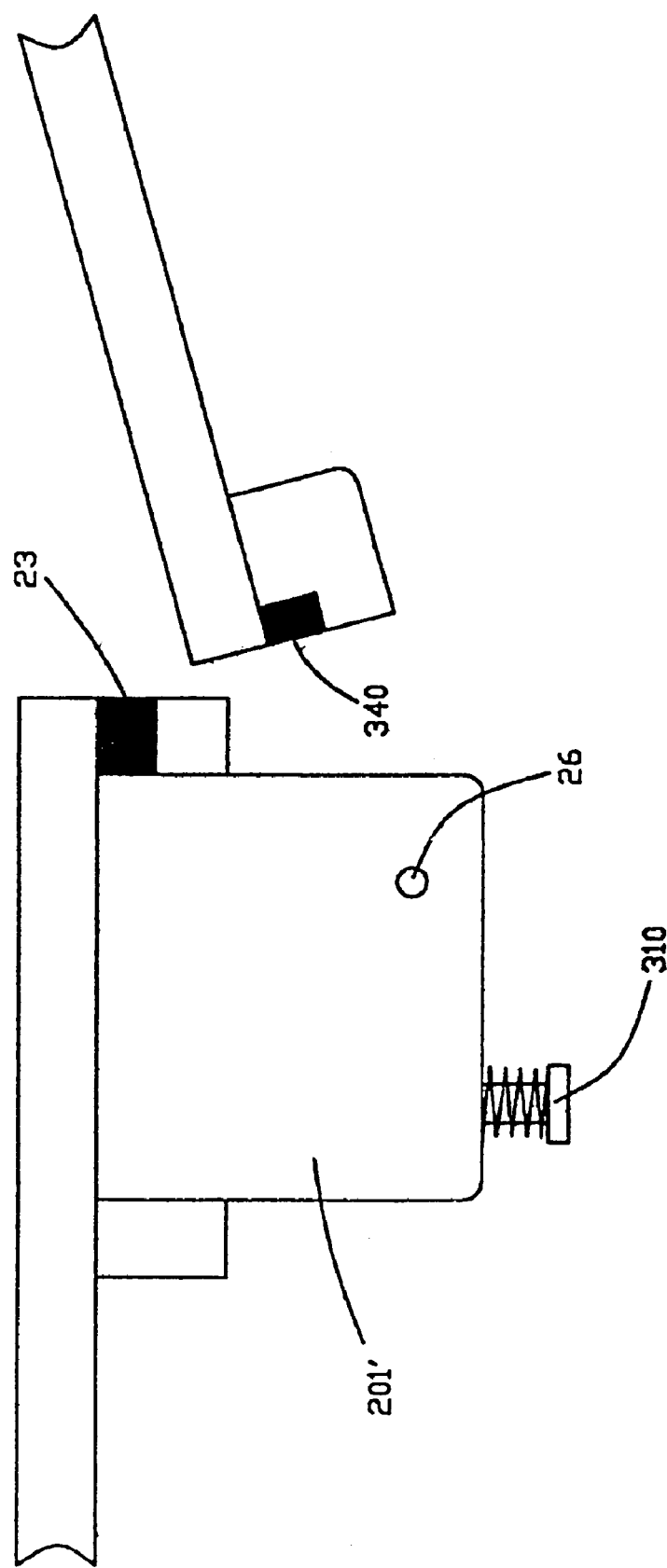
FIG. 8 is a cross-sectional view of an extension of an external bilateral telephone interface remote control system adapted for a lock according to an embodiment of the present invention.
Figure 9:
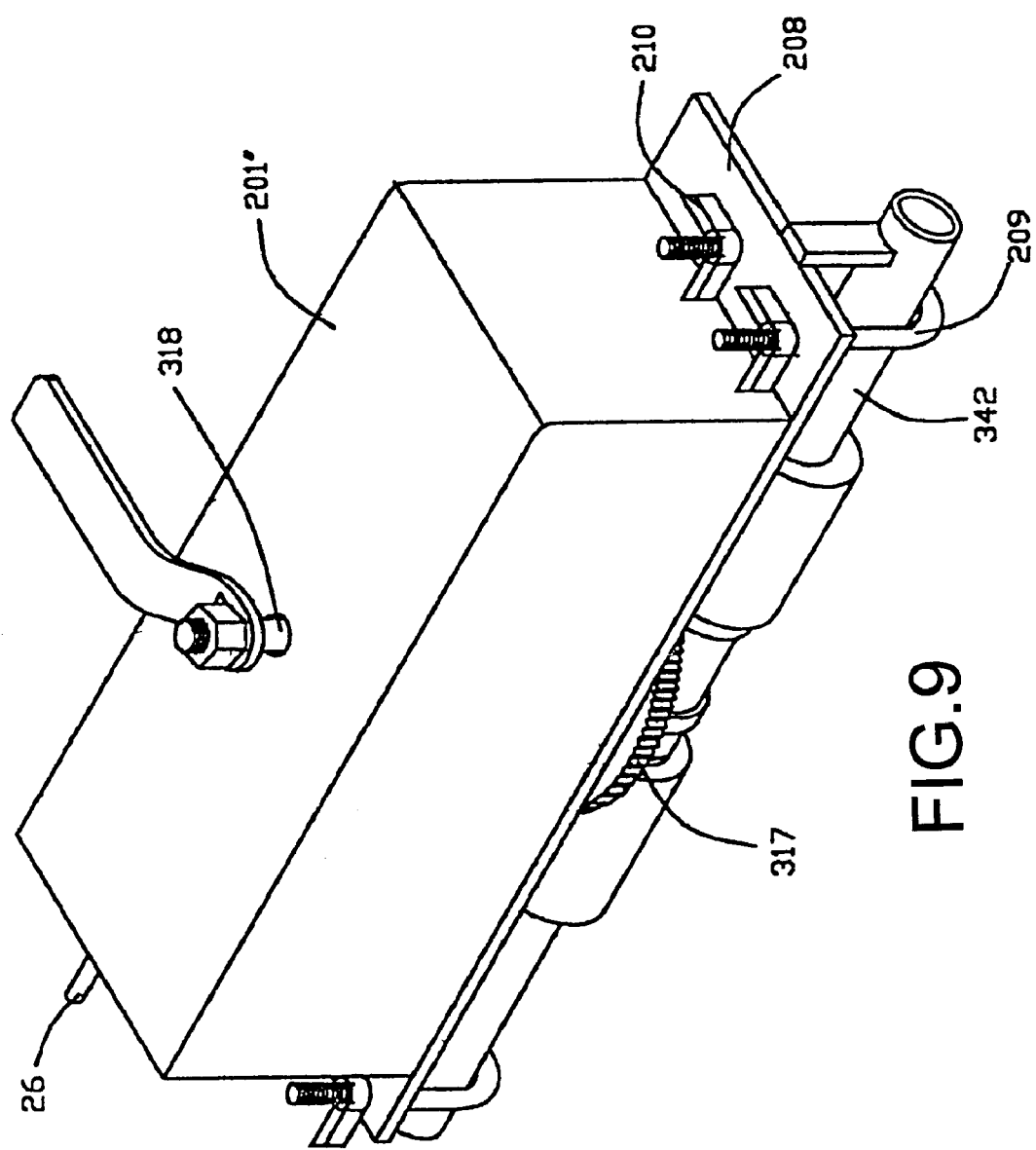
FIG. 9 is a cross-sectional view of an extension of an external bilateral telephone interface remote control system adapted for a gas switch according to an embodiment of the present invention.
Figure 10:
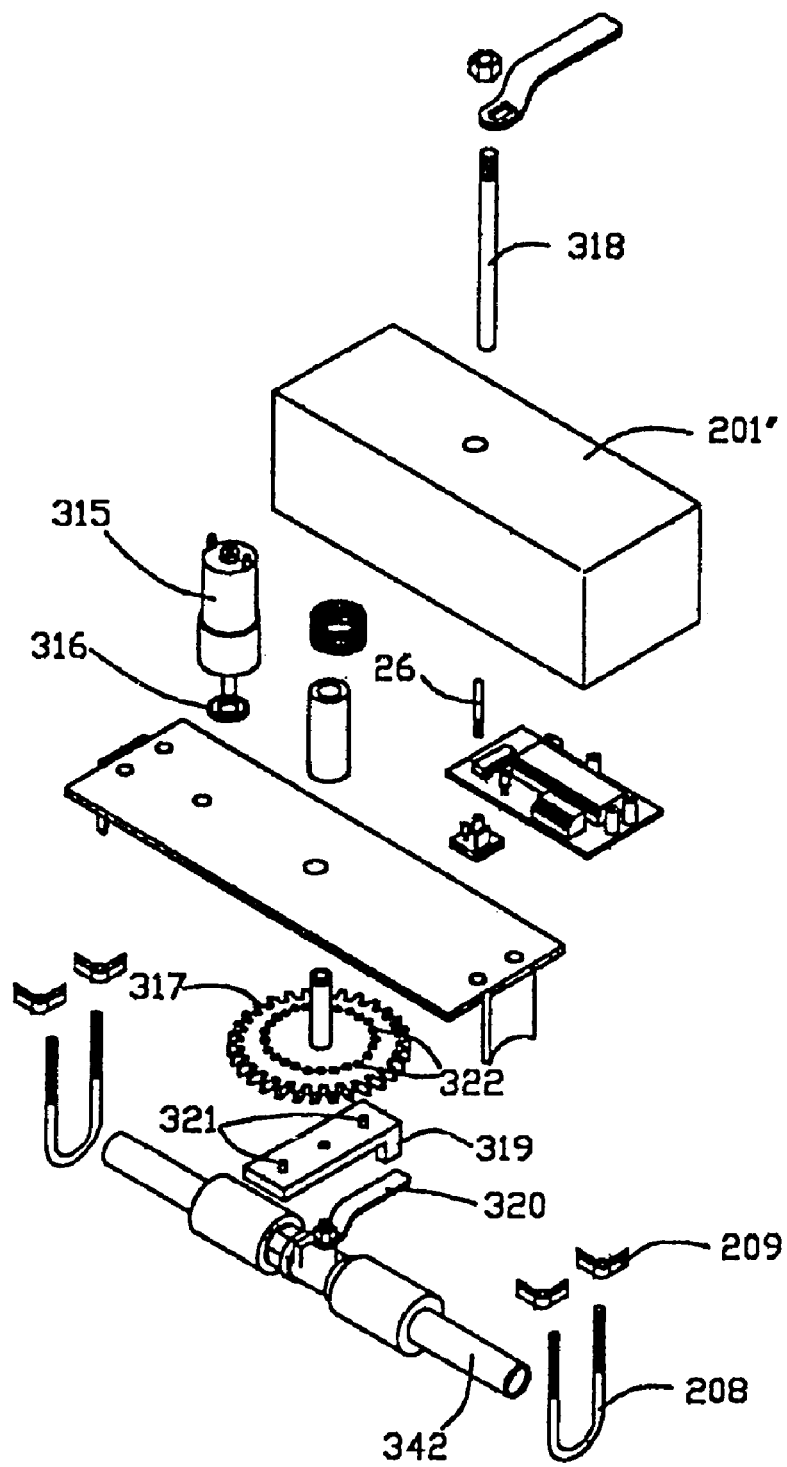
FIG. 10 is a deconstruction view?? of an extension of an external bilateral telephone interface remote control system adapted for a gas switch according to an embodiment of the present invention.
Figure 11:
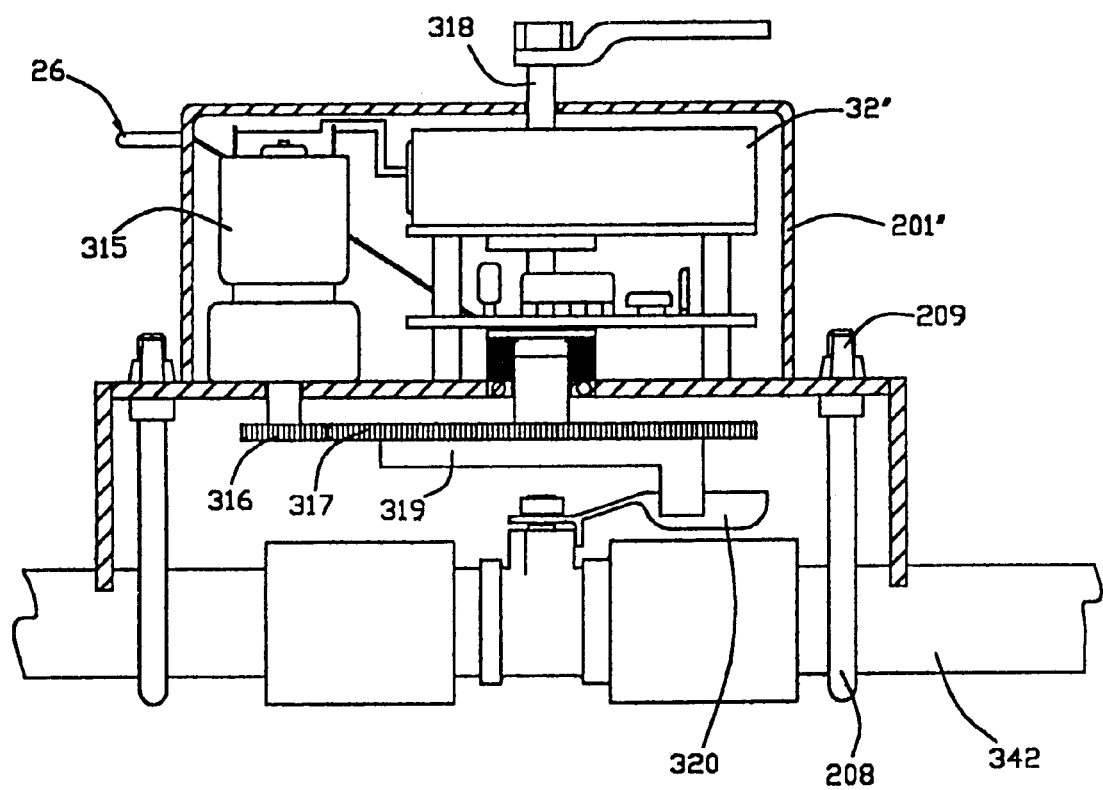
FIG. 11 is a cross-sectional view of an extension of an external bilateral telephone interface remote control system adapted for a gas switch according to an embodiment of the present invention.
Figure 12:
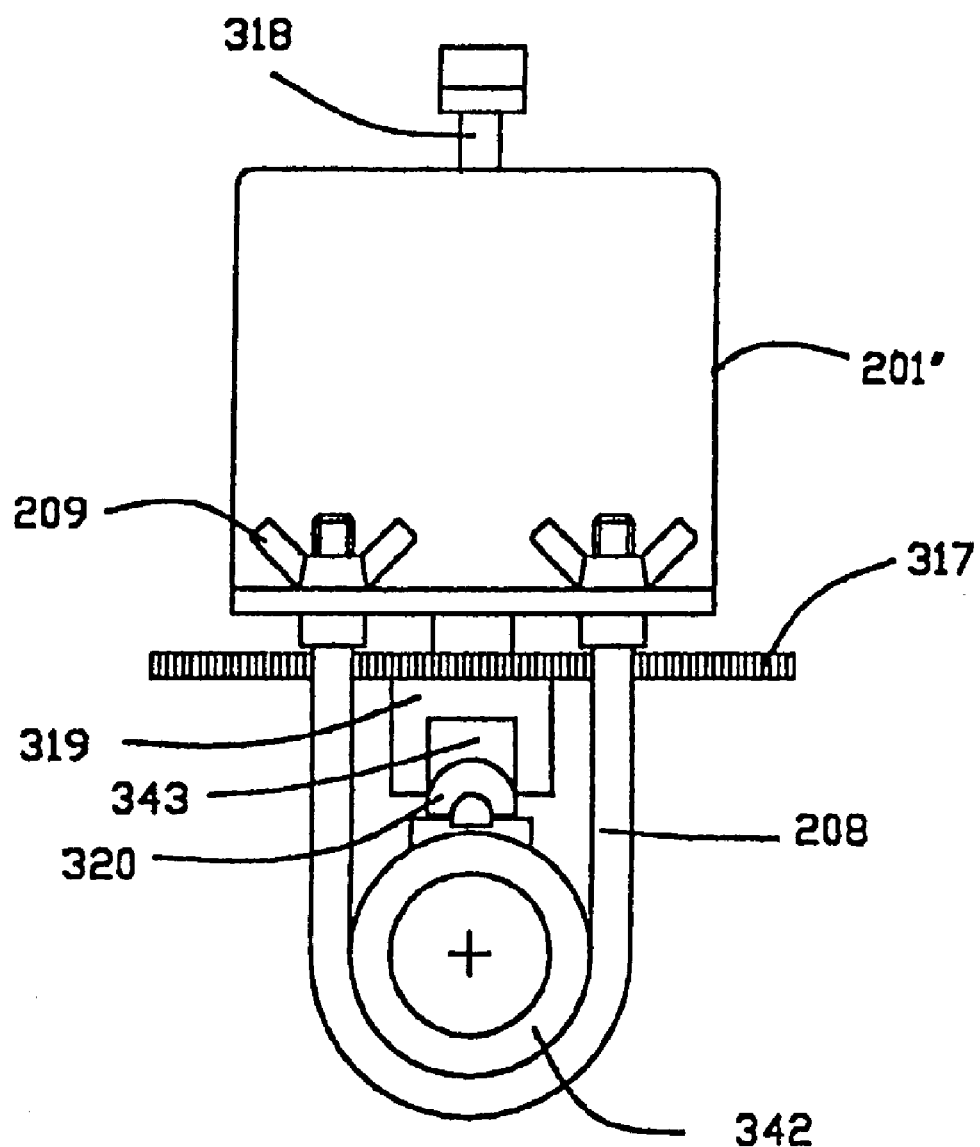
FIG. 12 is a cross-sectional view of an extension of an external bilateral telephone interface remote control system adapted for a gas switch according to an embodiment of the present invention.

FIGS. 1B and 4–9 are views illustrating an externally-hanging remote control extension for a door lock according to an embodiment of the present invention. The externally-hanging remote control extension comprises a shell 201'; a RF wireless transceiving unit 17; a micro processing unit 19, an address encoding unit 18, a battery charging and detecting unit 21; a switch driving module 24 having a switching driving circuit 20; a motor 311', a cam 312 fixed on the axis of the motor 311'; a spring stick 313 disposed between the cam and an indoor switch 314, such as a manual switch of a magnetic lock, and an action-ascertained feedback module 25. When the RF wireless transceiving unit receives a remote open-door signal from the remote control host, the remote open-door signal is transmitted to and processed by the micro processing unit for generating a control signal, which passes through the switch driving circuit unit 20 to rotate the motor by a proper angle to push the button of the magnetic lock downwards, and turn on a circuit of the magnetic lock for removing the bolt and then opening the lock. Therefore, when the user forgot the key, the user can use the cellular phone to dial a phone number to open the door. Referring to FIG. 8, the action-confirm feedback module 25 comprises a sensing unit 23, such as a Hall device; a sensor driving circuit unit 22, wherein the Hall device is disposed on a side of the shell 201', and coupled to the sensor driving circuit unit; and a magnet 340 disposed at a side edge of a door corresponding to the Hall device so as to determine whether the door is opened completely by a magnetic effect of the Hall device and the sensor driving circuit unit. Then, an action-confirm signal is generated therefrom and transmitted to and processed by the micro processing unit. Later, the processed signal is fed back to the original caller through the RF wireless transceiving units of the extension and the host, as well as the phone interface processing unit.

According to the present invention, a manual spring stick 310 is disposed above the spring stick 313. The manual spring stick 310 has two legs 323 where a space is formed between the two legs 323 for avoiding the conflict of operations of the cam 312, in which the two legs 323 can move upwards or downwards to press the manual button switch 314 for disengaging the lock.

Figure 13:
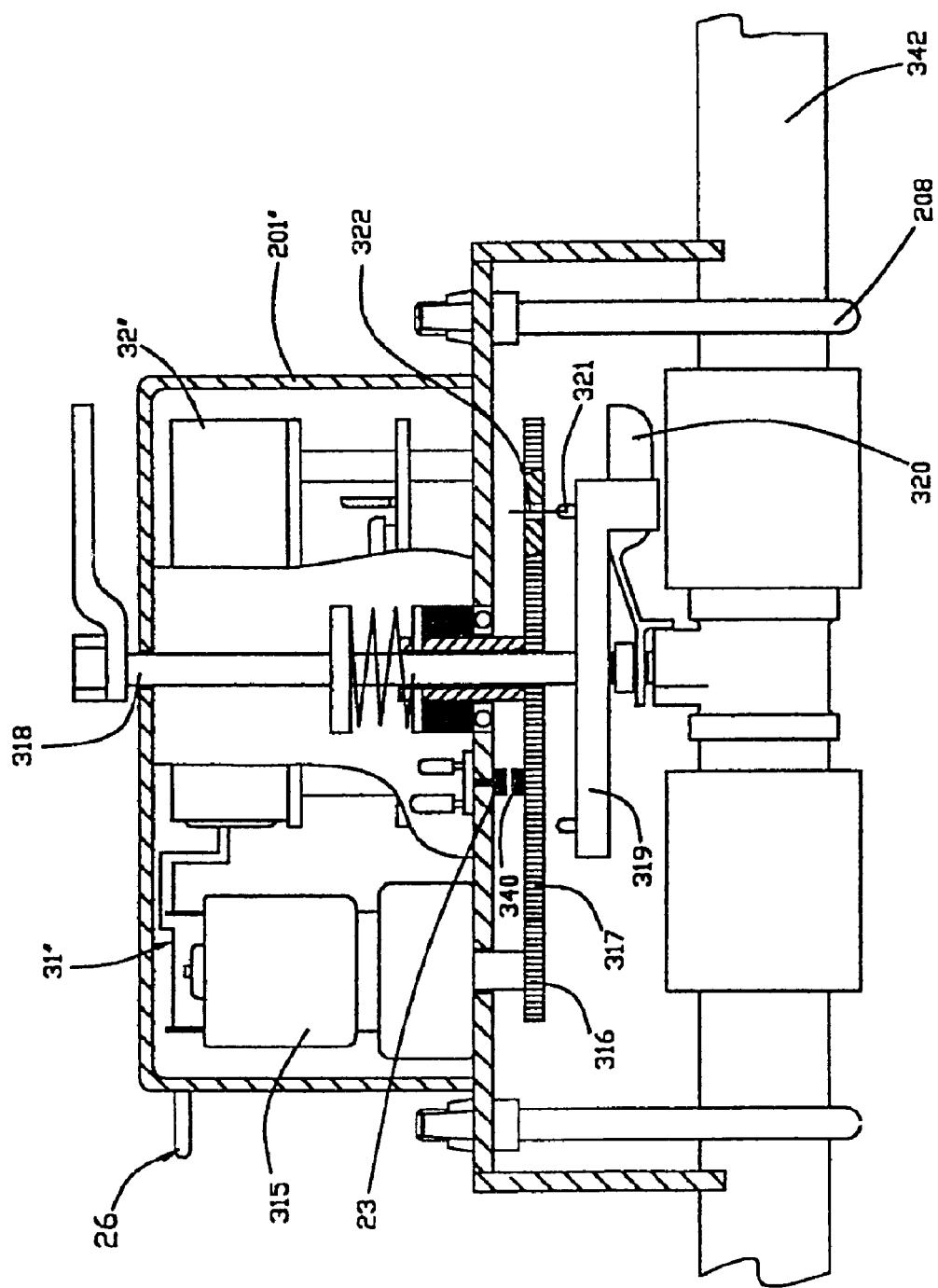
FIG. 13 is a cross-sectional view of an extension of an external bilateral telephone interface remote control system adapted for a gas switch of according to an embodiment of the present invention in which the spring stick is pressed.
Figure 14:
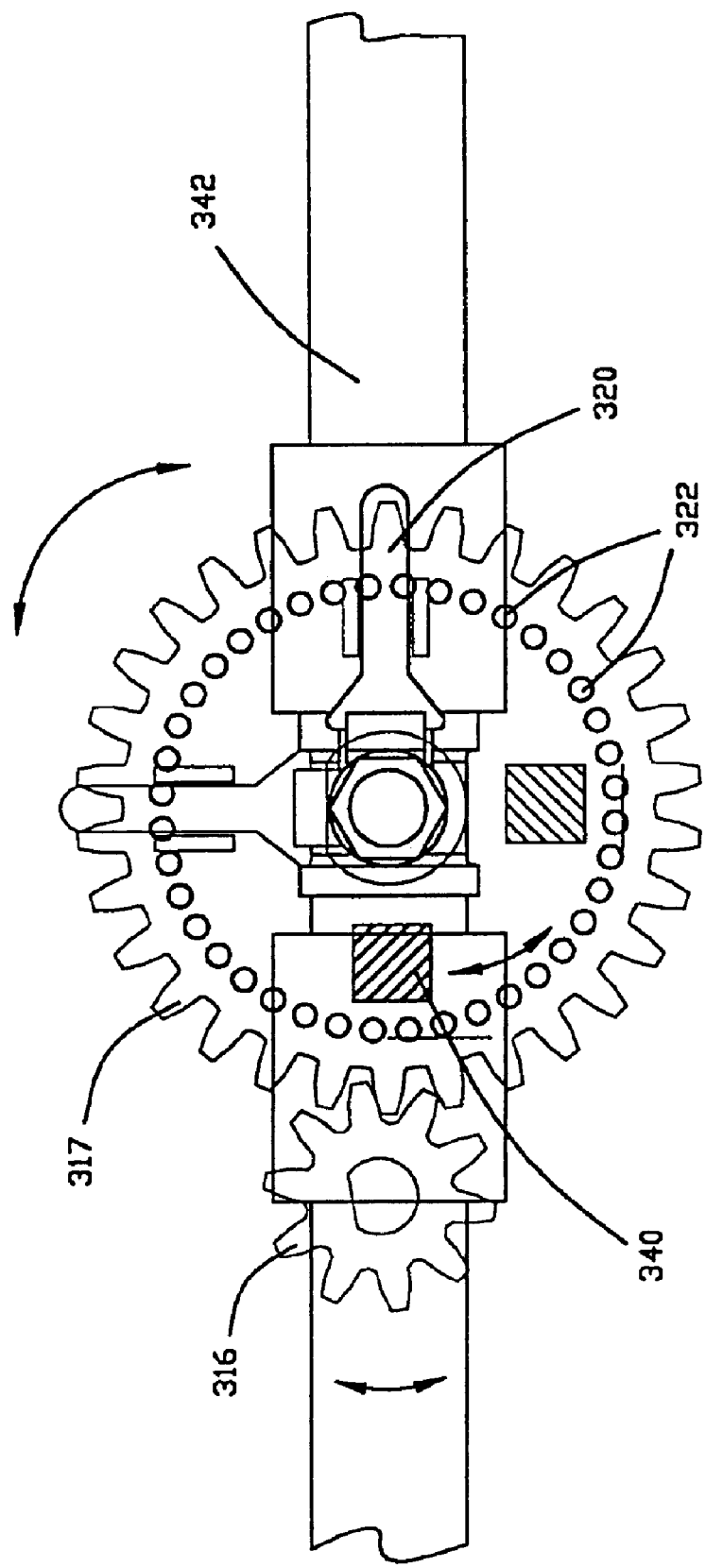
FIG. 14 is a cross-sectional top view of an extension of an external bilateral telephone interface remote control system adapted for a gas switch according to an embodiment of the present invention.

FIGS. 1B and 9–14 are views illustrating an externally-hanging remote control extension for a gas switch according to an embodiment of the present invention. The externally-hanging remote control extension comprises a rectangular shell 201″ having two fins 208 each having a fixing hole thereon, for control a U-shape sticks 209 and nuts 210 as to dispose the shell on the gas pipe 342 by a removal way; a RF wireless transceiving unit 26; a micro processing unit 28; an address encoding unit 27; a battery charging and detecting unit 32; a switch driving module 24′ having a switching driving circuit 20; a reversible motor 315; a small gear 316 fixed on the axis of the motor; and a big gear 317 that is engaged with the small gear and fixed near to the bottom of a spring stick 318. A lateral enabling stick 319 is fixed at the bottom of the spring stick, and is movable along a U-trench 343 between a manual gas switch 320 and the big gear 313. Referring to FIG. 13, the lateral enabling stick 319 has two symmetric extrusions 321, which are adapted to sleeve into two opposite holes of the circular holes 322 of the big gear 317, so as to rotate the big gear 317 to enable the lateral enabling stick 319 to rotate the gas switch 320, when the spring stick 318 moves upward. If the user presses the spring stick 318, the lateral enabling stick 319 moves downward. Then the extrusions 321 move out from the holes 322 of the big gear for manually switching the gas switch.

When the RF wireless transceiving unit receives the signal for turning off the gas switch from the remote-controlled host, the signal is sent to the micro processing unit for transmitting a control signal to the motor via the switch driving circuit unit for rotating the motor by a proper angle, so as to enable the lateral enabling stick and the manual switch to rotate a proper angle for turning off the gas switch, or to reversely rotate by a proper angle for tuning on the switch. Therefore, when the user forgot to turn off the gas or stove, the user can use his cellular phone to dial a phone number to turn on or off the gas source, i.e., the switch.

The action-confirm feedback module 25 comprises a sensing unit 23, such as a Hall device; a sensor driving circuit unit 22. The Hall device is disposed on a side of a circuit board of the extension, and coupled to the sensor driving circuit unit. A magnet 340 is disposed at a side edge of the big gear corresponding to the Hall device so as to determine whether the operation of turning off the gas source is complete by magnetic effect of the Hall device and the sensor driving circuit unit. Then, an action-confirm signal is generated and transmitted to and processed by the micro processing unit. The processed signal is fed back to the original caller through the RF wireless transceiving units of the extension and the host, as well as the phone interface processing unit.

Figure 17:
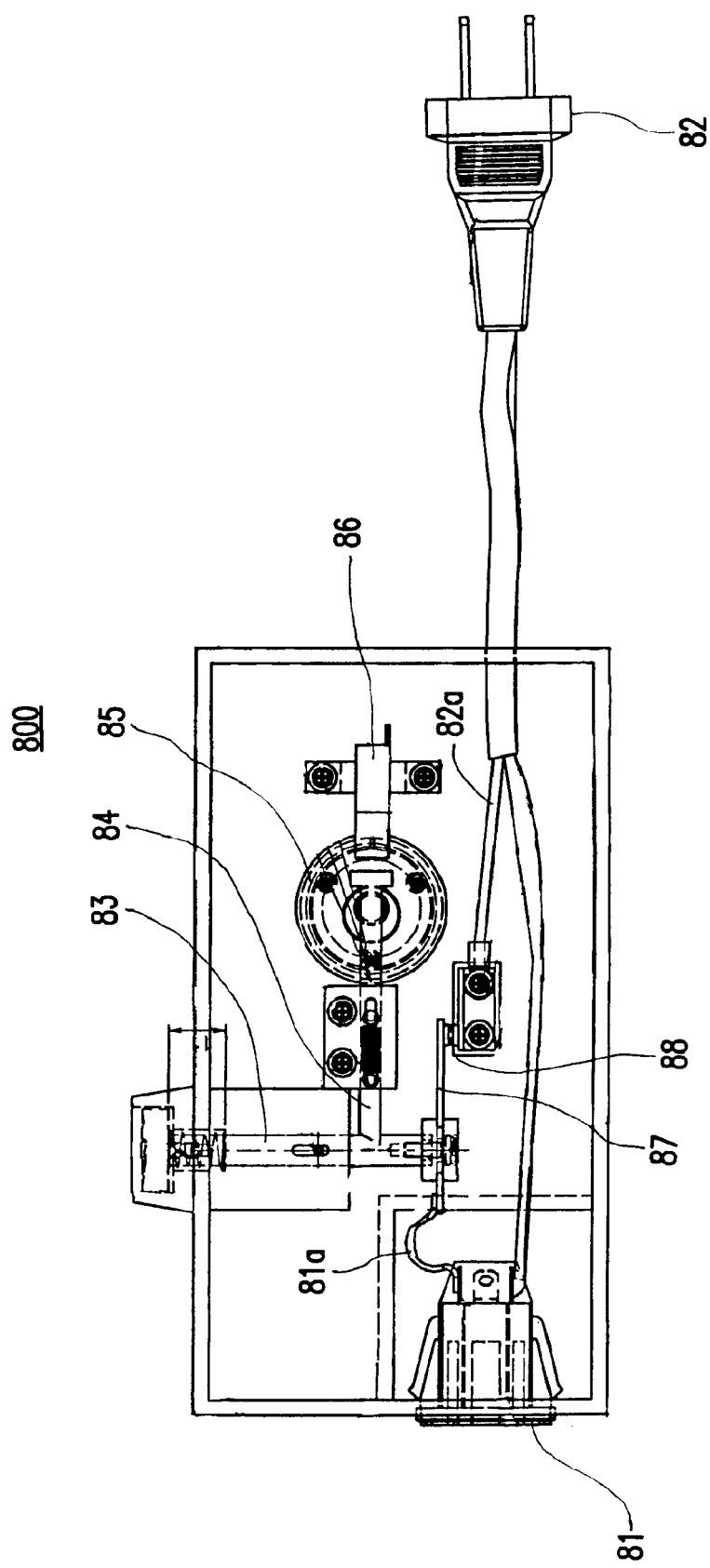
FIGS. 17 to 19 and 20A to 20E show other applications of the external bilateral telephone interface remote control system according to an embodiment of the present invention.

FIG. 17 shows another application of the external bilateral telephone interface remote control system according to an embodiment of the prevention. This application relates to a safety plug 800 for appliances. The plug of the appliance can be inserted to the socket 81 of the safety plug 800, and the plug 82 is then connected to the commercial power socket for getting power. The socket 81 is configured to connect to the plug 82, wherein one end 81a of the socket 81 is connected to one end 82a of the plug through a metal plate 87 and a metal member 88. The metal plate 87 and the metal member 88 are detachably coupled together. Namely, the metal plate 87 can be in contact with the metal member 88 to provide an electrical connection between the socket 81 and the plug 82, or the metal plate 87 and the metal member 88 are separated from each other to disconnect the socket 81 and the plug 82.

A pin 83 is coupled to the metal plate 87 so that the pin 83 moves to connect or disconnect the metal plate 87 with the metal member 88. The safety plug 800 further comprises a motor module 85 whose shaft is connected to a linking rod 84 with a tilted tip. There is a notch formed on the pin 83, and the notch is engaged with the linking rod 84 through the tilted tip. By using the tilted tip and the notch, when the motor module 85 rotates to move the linking rod 84, the tilted tip is engaged with the notch, so that the pin 83 moves downwards (relative to the drawing) to make the metal plate 87 to be in contact with the metal member 88. Therefore, the socket 81 is electrically coupled to the plug 82. When the motor module 85 rotates to move the linking rod 84 reversely, the tilted tip is disengaged with the notch, so that the pin 83 moves upwards (relative to the drawing) to make the metal plate 87 to be separated from the metal member 88. Therefore, the socket 81 and the plug 82 are disconnected.

An optical sensor 86 is further installed in the safety plug 800 for receiving from and transmitting to the host or the extension. The optical sensor 86 can function as a transceiver and a position sensor for the linking rod 87. The optical sensor 86 can detect and determine whether the linking rod 87 is at the right location. This detected result can be transmitted to the host or the extension in the aforementioned manner. Therefore, the user can realize the power supply situation of the appliance. On the other hand, if the user forgets turning off the appliance or wants to remotely turn on the appliance, the user can use the phone or the cellular phone to call the extension to control the safety plug 800, so as to remotely turn on or off the power supplied to the appliance that is connected to the safety plug 800. In contrast, if any abnormal condition of occurs, the optical sensor 86 will detect the situation and then transmits a signal to the extension. In this way, as described above, the extension can establish a network with the host and informs the situation to the user.

Figure 18:
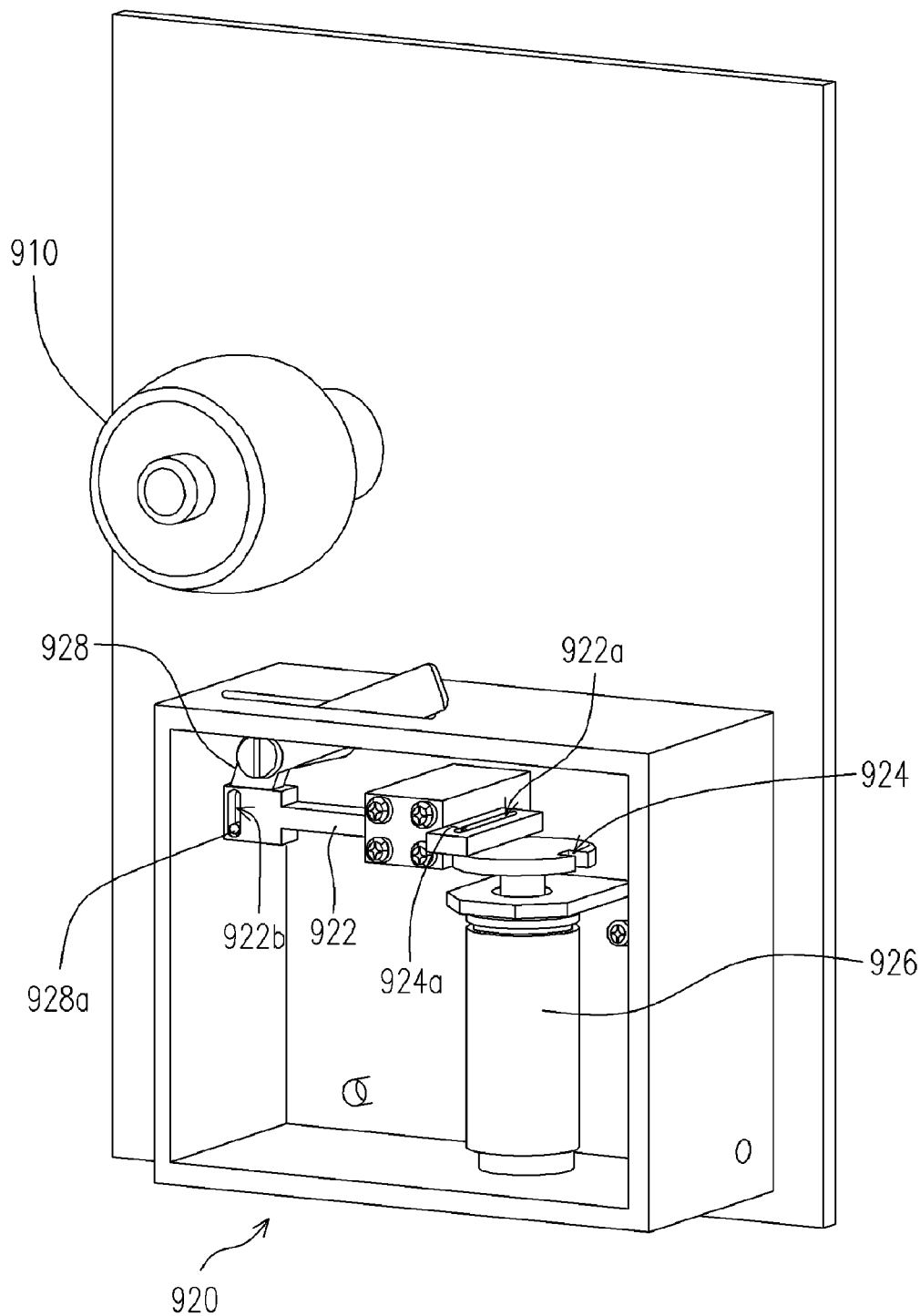
Figure 19:
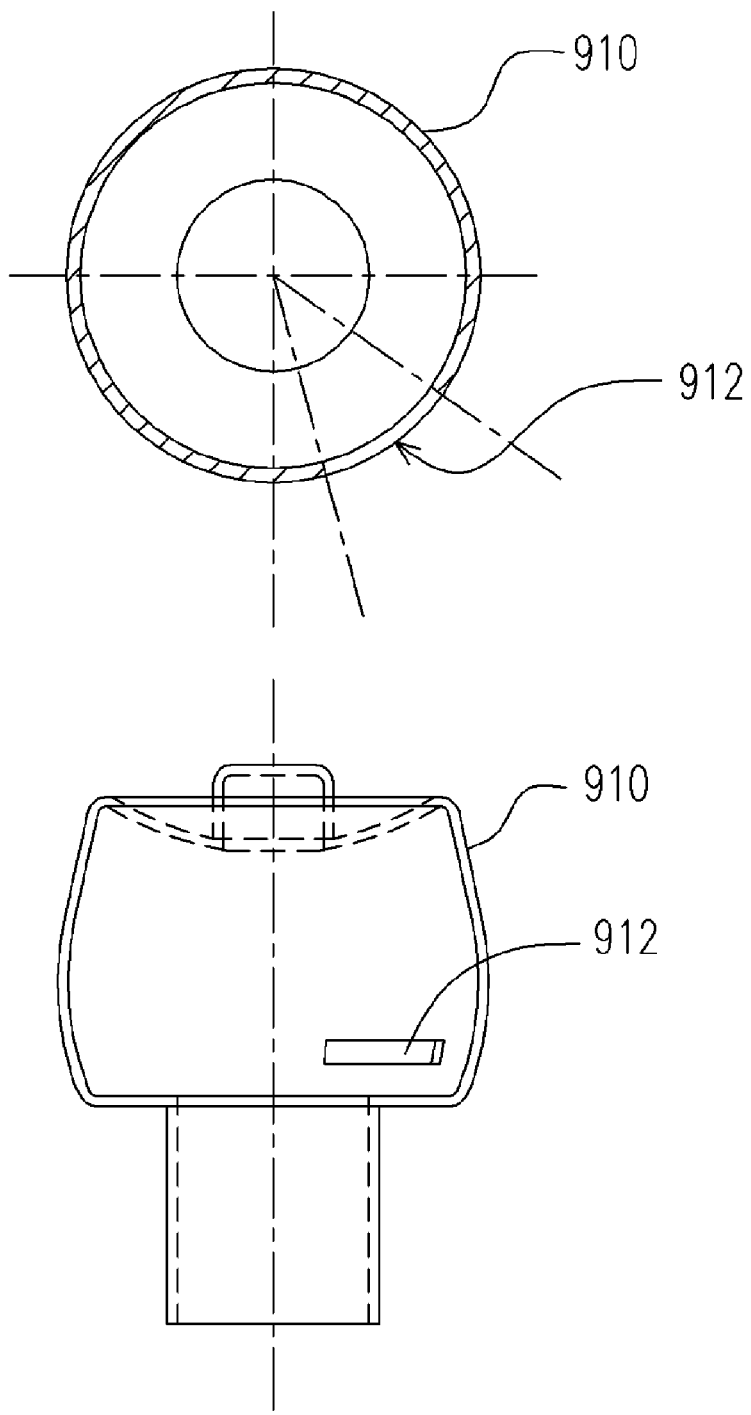

Fig. FIG. 18 shows another application of the external bilateral telephone interface remote control system. This application relates to a door knob. Referring to FIG. 18, the door knob system 900 comprises a door knob 910 and a control module 920. The door knob 910 can be any kind. The control module 920 comprises a linking rod 922, a detection plate 924, a motor 926, a pushing rod 928. There are a horizontal guiding groove 922a and a vertical guiding groove 922b formed on the two end portions of the linking rod 922. An engaging pin 924a is formed on the detection plate 924 to engage with the horizontal guiding groove 922a of the linking rod 922 in a manner that the linking rod 922 can move horizontally when the detection plate 924 rotates. Furthermore, the pushing rod 928 is coupled to the linking rod 922 through an engaging pin 928a in a manner that the pushing rod 928 is rotated when the detection plate 924 rotates to move the linking rod 922 horizontally. In this embodiment, referring to FIG. 19, there is a slit 912 formed on the handle portion of the door knob 910. In this way, one end of the pushing rod 928 is inserted into the slit 912.

For example, when the detection plate 924 is rotated by the motor 926 to move the linking rod 922 horizontally (right or left, with respect to the drawings), the pushing rod 928 is accordingly rotated due to the movement of the engaging pin 928a along the vertical guiding groove 922b. In this way, the pushing rod 928 is able to rotate the door knob 910 to open or close the door.

Figure 20A:
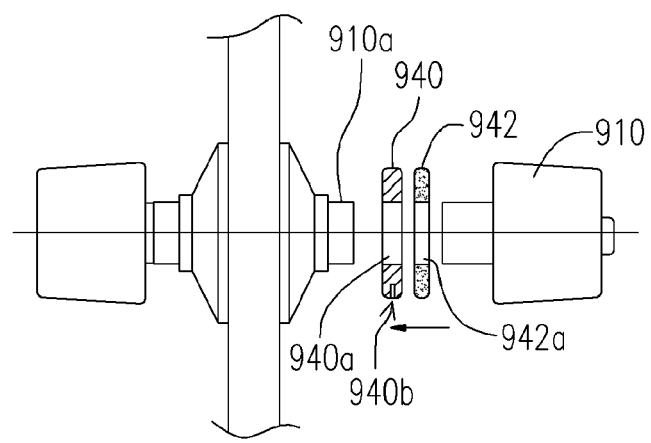
Figure 20B:
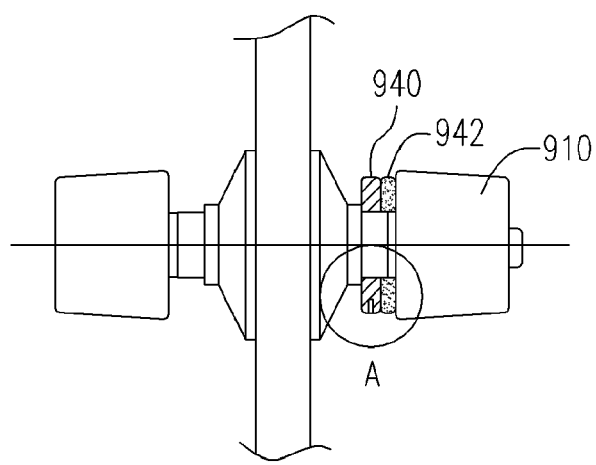
Figure 20C:
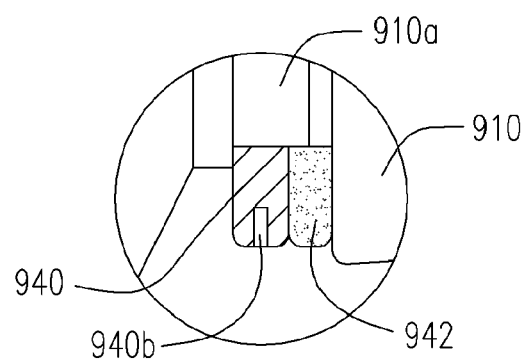
Figure 20D:
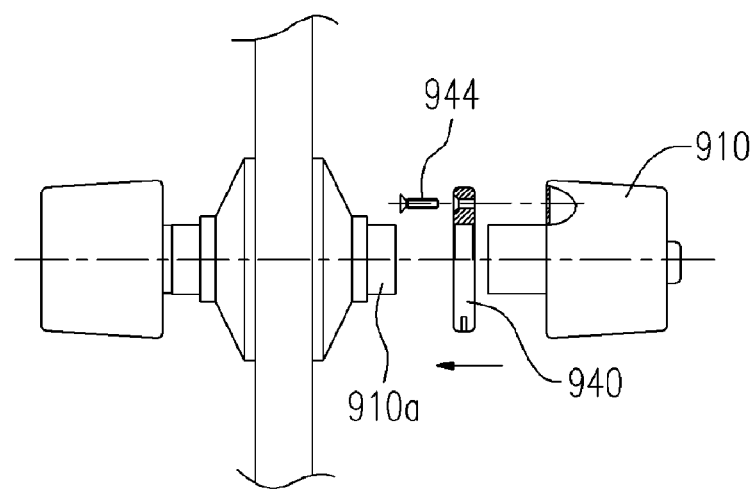
Figure 20E:
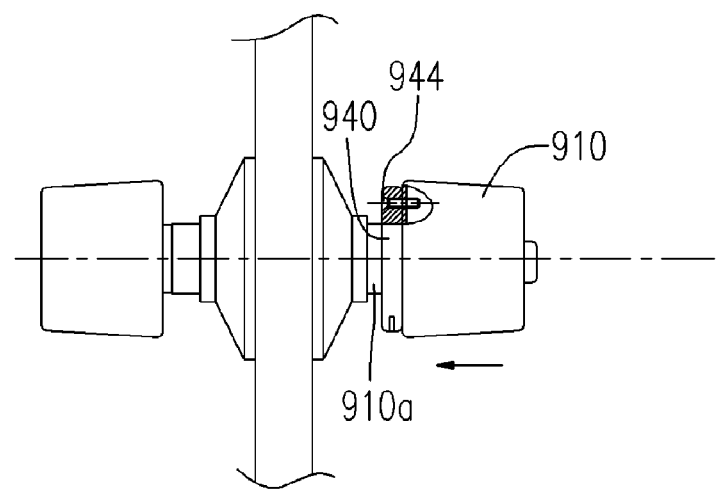

FIGS. 20A to 20C are another example of door knob structure. FIG. 20A is a diagram of parts of the example before installation, FIG. 20B is a diagram showing the related parts are installed, and FIG. 20C shows an enlarged diagram showing a detail structure of the example. Referring to FIG. 20a, this example provides a fixing member 940 and an adhesive washer 942. When installing the fixing member 940 and the adhesive washer 942, the door knob 910 is removed from the neck portion 910a. A hole 940a is formed at the center of the fixing member 940, and the hole 940a has a diameter substantially same as the diameter of the neck portion 910a, so that the fixing member can be fixed into the neck portion 910a. Then, the adhesive washer 942, also having hole 940a with a diameter substantially same as the diameter of the neck portion 910a, is inserted between the fixing member 940 and the door knob 910 through the neck portion 910a. Since the adhesive washer 942 is adhesive or magnetic, the adhesive washer 942 can provide a firm connection between the fixing member 940 and the door knob 910. In addition, a slit 940b is formed in the fixing member 940 so as to receive the pushing rod 928. In this way, when the pushing rod 928 is driven, the pushing rod 928 can rotate the neck portion 910a to open or close the door. FIGS. 20D and 20E show another example. In FIG. 20, tap screws 944 are used to replace the adhesive washer 942. In other words, the fixing member 940 is directly screwed to the door knob 910 through the tap screws 944 without using the adhesive washer 942.

In the above description, the depicted door knob and the control module are only examples. For those skilled in this art, the control module 920 can be suitably modified according to the door knob type. In the above example, the slit 912 is formed on the door knob or receiving the pushing rod 928 to open or close the door. Instead, a rough cover can be invaginated to the door knob 910 without changing the physical structure of the locker. Accordingly, the pushing rod 928 of control module 920 has to be modified accordingly to meet the rough cover structure.

A sensor is further installed in the door knob system 900 for receiving from and transmitting to the host or the extension. The sensor can function as a transceiver and a position sensor for the linking rod 922. The optical sensor can detect and determine whether the linking rod 922 is at the right location. This detected result can be transmitted to the host or the extension in the aforementioned manner. Therefore, the user can realize whether the door is opened or closed. On the other hand, if the user forgets bring his/her key, the user can use the phone or the cellular phone to call the extension to control the door knob system 900, so as to remotely open the door. In contrast, if any abnormal condition of occurs, such as someone invade the house, the sensor will detect the situation and then transmits a signal to the extension. In this way, as described above, the extension can establish a network with the host and informs the situation to the user.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

The invention claimed is:

1. An external bilateral telephone interface remote control system, comprising:
   an external remote control host, having an input terminal coupled to a phone line and an separate external addition-type remote control extension that is detachably coupled to at least one wire or wireless switch of a separate equipment for forming a remote control network as to control the wire or wireless switch via a phone, wherein
   the external remote control host comprises:
      a phone interface processing unit, adapted for processing and receiving phone signals;
      a memory unit, adapted for storing a preset remote control code;
      a processing unit, adapted for identifying and processing a control signal from the phone line;
      a display unit, adapted for displaying a power situation of the separate external addition-type remote control extension; and
      a RF wireless transceiving unit, adapted for receiving and transmitting signals between the processing unit and a RF wireless transceiving unit of the separate external addition-type remote control extension,
   the separate external addition-type remote control extension further comprises:
      a feed back module, adapted for generating a feedback signal;
      a processing unit, adapted for identifying and processing a remote control signal from the RF wireless transceiving unit of the separate external addition-type remote control extension and the feedback signal from the feedback module;
      a switch driving module, adapted for turning on or off the wire or wireless switch according to the remote control signal from the processing unit; and
      an address encoding unit, adapted for encoding the on or off of the wire or wireless switch, thereby performing the bilateral remote control via the remote control network and the phone line.

2. The external bilateral telephone interface remote control system of claim 1, wherein the external remote control host further comprises a power supply and a battery charging and detecting unit disposed between the processing unit and the power supply.

3. The external bilateral telephone interface remote control system of claim 1, wherein the external remote control host further comprises a keyboard unit coupled to the processing unit.

4. The external bilateral telephone interface remote control system of claim 1, wherein the separate external addition-type remote control extension further comprises:
   a super display, comprising a phone interface processing unit, adapted for receiving and transmitting a phone signal;
   a memory, adapted for storing a preset remote control code;
   a processing unit, adapted for identifying and processing a remote control signal; and
   a display unit, adapted for displaying an operation condition of wire or wireless equipment coupled to the separate external addition-type remote control extension.

5. The external bilateral telephone interface remote control system of claim 4, wherein the super display further comprises a power supply and a battery charging and detecting unit disposed between the processing unit and the power supply.

6. The external bilateral telephone interface remote control system of claim 4, wherein the super display further comprises a keyboard unit coupled to the processing unit.

7. The external bilateral telephone interface remote control system of claim 1, wherein the switch driving module comprises a motor, a sensing unit disposed in the separate equipment and a sensing driving unit coupled to the sensing unit.

8. The external bilateral telephone interface remote control system of claim 1, wherein the switch driving module comprises:
   a switch driving circuit unit;
   a motor;
   a cam fixed at the axis of the motor;
   a spring stick disposed between the cam and a manual switch of a magnetic lock, wherein when the RF wireless transceiving unit receives a remote switching signal from the remote control host, the remote switching signal is transmitted to and processed by the processing unit for generating a control signal, which passes through the switch driving circuit unit to the motor for rotating a proper angle as to push the button of the magnetic lock upward, turn on a circuit of the magnetic lock for unlocking the lock.

9. The external bilateral telephone interface remote control system of claim 8, wherein the switch driving module further comprises a manual spring stick over the spring stick, the manual spring stick has two legs for avoiding conflict with the cam, and when the manual spring stick is pushed downward, the lock is unlocked.

10. The external bilateral telephone interface remote control system of claim 1, wherein the switch driving module comprises:
    a switch driving circuit unit;
    a motor; and
    a small gear fixed on the axis of the motor, the small gear gearing with a big gear, which is fixed at a bottom of a spring stick, a lateral enabling stick fixed at the bottom of the spring stick, the lateral enabling stick is movable along a U-trench between a manual gas switch and the big gear.

11. The external bilateral telephone interface remote control system of claims 8, wherein the feedback module comprises:
    a Hall device, disposed on a side of the remote control extension and coupled to a sensing driving circuit unit; and
    a magnet, disposed at a side edge of a door corresponding to the Hall device for determining whether the door is opened by magnetic effect of the sensing driving circuit unit and the Hall device, a signal generated therefrom transmitted to and processed by the processing unit, which is fed back to an original caller through the extension, the RF wireless transceiving unit of the host and the phone interface processing unit.

12. The external bilateral telephone interface remote control system of claims 10, wherein the feedback module comprises:
    a Hall device, disposed on a side of the remote control extension and coupled to a sensing driving circuit unit; and
    a magnet disposed at a side edge of a big gear corresponding to the Hall device for determining whether the gas switch is closed by magnetic effect of the sensing driving circuit unit and the Hall device, a signal generated therefrom transmitted to and processed by the processing unit, which is fed back to an original caller through the extension, the RF wireless transceiving unit of the host and the phone interface processing unit.

13. The external bilateral telephone interface remote control system of claim 10, wherein the lateral enabling stick has two symmetric extrusions, which are adapted to sleeve into holes within the big gear in circle for rotating the big gear enabling the lateral enabling stick, as to switch the gas switch, when the spring stick moves upward.

14. The external bilateral telephone interface remote control system of claim 1, wherein the switch driving module comprises:
    a switch driving circuit unit,
    a motor module;
    a linking rod driven by the motor module; and
    a pin engaged with the linking rod capable of being moved by the linking rod; a metal plate coupled to the pin and a socket; a metal member coupled to a plug; and an optical sensing unit,
    wherein the metal plate and the metal member is able to be connected or separated due to a movement of the pin, so as to connect or disconnect the socket and the plug, and
    wherein the optical sensing unit is able to sense and transmit signals between the external remote control host and the separate external addition-type remote control extension.

15. The external bilateral telephone interface remote control system of claim 1, wherein the switch driving module is a door knob system, and the door knob system comprises
    a door knob with a coupling member;
    a motor module;
    a linking rod driven by the motor module;
    a pushing module with one end coupled to the linking rod and another end coupled to the coupling member of the locker, wherein the linking rod is able to moved to activate the pushing module to drive the door knob to open or close a door; and
    a sensor able to sense and transmit signals between the external remote control host and the separate external addition-type remote control extension.

16. The external bilateral telephone interface remote control system of claim 15, wherein the coupling member of the door knob is a slit formed on the knob, and the pushing module is a pushing rod inserted into the slit to drive the knob.

17. The external bilateral telephone interface remote control system of claim 15, wherein the coupling member of the door knob is a rough cover.

18. The external bilateral telephone interface remote control system of claim 15, wherein the coupling member of the door knob comprises a fixing member and an adhesive member, wherein the fixing member and the adhesive member are sleeved into a neck portion of the door knob, and a slit is formed in the fixing member for receiving the pushing rod.

19. An external bilateral telephone interface remote control system, comprising:
    an external remote control host, having an input terminal coupled to a phone line and an output terminal coupled to an separate external addition-type remote control extension coupled to a wire or wireless switch for forming a remote control network as to control the wire or wireless switch by a phone, wherein the external remote control host comprises:
    a phone transmitting module, adapted for informing a remote super of abnormal data detected by the separate external addition-type remote control extension and the operation thereof through preset phone numbers and voice messages, the remote super inputting control signals via a phone for controlling the wire or wireless equipment;

a memory unit, adapted for storing preset remote control codes, the control signals and feedback signals from a RF wireless transceiving unit of the separate external addition-type remote control extension;

a processing unit, adapted for identifying and processing the control signals from the phone line, a key-board of the host and the external remote control extension;

a display unit, adapted for displaying abnormal data detected by the sensing unit and the switching driving module of the separate external addition-type remote control extension;

a RF wireless transceiving unit, adapted for receiving and transmitting correct control signals and feedback signals from the processing unit and a RF wireless transceiving unit of the separate external addition-type remote control extension; and an alarm unit, adapted for sending out alarm signals, the separate external addition-type remote control extension comprises:

a shell;

a sensing unit, adapted for sensing a temperature, a pressure, a concentration, a wind or a PH value;

a switch driving module, adapted for turning on or off the wire or wireless switch;

a feed back module, adapted for generating a feedback signal thereby performing the bilateral remote control via the remote control network and the phone line;

a sensing driving circuit unit, adapted for transmitting said temperature, pressure, concentration, wind or PH value data to a comparing unit;

a setting unit, adapted for setting values for the temperature, the pressure, the concentration, the wind or the PH value;

a comparator unit, adapted for determining whether the temperature, the pressure, the concentration, the wind or the PH value data exceeds the setting values, whether the switch driving module is turned on and whether a feedback signal is transmitted to the host;

a processing unit, adapted for identifying and processing a remote control signal from the RF wireless transceiving unit of the separate external addition-type remote control extension and the feedback signal from the feedback module; and a switch driving module, adapted for turning on or off the wire or wireless switch.

20. The external bilateral telephone interface remote control system of claim 19, wherein the external remote control host further comprises: a charging unit, adapted for supplying power to the host when an original power supplied thereto is turned off; and a host power supply unit, adapted for supplying powers thereto.

21. The external bilateral telephone interface remote control system of claim 19, wherein the external remote control host further comprises a key-board array unit, adapted for keying indexes and phone numbers.

22. The external bilateral telephone interface remote control system of claim 19, wherein the external remote control extension further comprises a charging unit, adapted for supplying power to the separate external addition-type remote control extension when an original caller supplied thereto is turned off; and an extension power supply unit, adapted for supplying powers thereto.

* * * * *